(12) United States Patent
Christopher

(10) Patent No.: US 8,441,351 B2
(45) Date of Patent: *May 14, 2013

(54) SYSTEM AND METHOD FOR TRACKING SHOPPING BEHAVIORS

(75) Inventor: James Christopher, La Mesa, CA (US)

(73) Assignee: Insight Holding Group, Inc., La Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,723

(22) Filed: May 24, 2012

(65) Prior Publication Data

US 2012/0249325 A1 Oct. 4, 2012

Related U.S. Application Data

(63) Continuation of application No. 11/853,223, filed on Sep. 11, 2007, now Pat. No. 8,207,851, which is a continuation-in-part of application No. 11/782,402, filed on Jul. 24, 2007, now Pat. No. 8,138,919, which is a continuation-in-part of application No. 11/683,903, filed on Mar. 8, 2007, now Pat. No. 7,772,976, which is a continuation-in-part of application No. 11/505,616, filed on Aug. 16, 2006, now Pat. No. 7, 683,782, and a continuation-in-part of application No. 11/506,179, filed on Aug. 16, 2006, now Pat. No. 7,728,729.

(51) Int. Cl.
*G08B 13/14* (2006.01)

(52) U.S. Cl.
USPC ............... 340/568.1; 340/539.13; 340/568.5; 340/988; 235/376

(58) Field of Classification Search ............... 340/10.41, 340/5.91, 539.13, 988, 572.2, 572.1, 568.5, 340/573.1, 539.16, 539.17, 568.1; 342/46; 701/218; 235/385, 383, 462.13
See application file for complete search history.

(56) References Cited

U.S. PATENT DOCUMENTS

| | | | | |
|---|---|---|---|---|
| 5,287,266 A | * | 2/1994 | Malec et al. | 705/1 |
| 5,295,064 A | * | 3/1994 | Malec et al. | 705/1 |
| 5,321,617 A | * | 6/1994 | Mori et al. | 701/49 |
| 5,630,068 A | * | 5/1997 | Vela et al. | 705/1 |
| 5,646,616 A | * | 7/1997 | Komatsu | 340/988 |
| 5,729,697 A | * | 3/1998 | Schkolnick et al. | 705/23 |
| 5,734,839 A | * | 3/1998 | Enoki et al. | 705/20 |
| 5,821,513 A | * | 10/1998 | O'Hagan et al. | 235/383 |
| 6,032,127 A | * | 2/2000 | Schkolnick et al. | 705/23 |
| 6,119,935 A | * | 9/2000 | Jelen et al. | 235/383 |
| 6,168,079 B1 | * | 1/2001 | Becker et al. | 235/383 |
| 6,486,768 B1 | * | 11/2002 | French et al. | 340/5.92 |
| 6,595,417 B2 | * | 7/2003 | O'Hagan et al. | 235/383 |
| 6,659,344 B2 | * | 12/2003 | Otto et al. | 235/381 |
| 7,152,789 B2 | * | 12/2006 | Hasegawa et al. | 235/383 |
| 7,242,303 B2 | * | 7/2007 | Patel et al. | 340/572.4 |
| 7,242,306 B2 | * | 7/2007 | Wildman et al. | 340/573.1 |

(Continued)

*Primary Examiner* — Hoi Lau
(74) *Attorney, Agent, or Firm* — Sheppard Mullin Richter & Hampton LL

(57) ABSTRACT

The present invention provides a system and method for tracking an interrogator relay unit disposed on a shopping cart within a store. The method comprises emitting an RF interrogation signal using the IRU; receiving, at the IRU, location data from an RFID tag in response to the RF interrogation signal; transmitting the location data, an identification information of the IRU, and timestamp data to a remote server using the IRU; and generating a behavior report using the transmitted location data, the identification information, and the timestamp data.

18 Claims, 20 Drawing Sheets

U.S. PATENT DOCUMENTS

| | | | |
|---|---|---|---|
| 7,325,096 B2* | 1/2008 | Mogi et al. | 711/113 |
| 7,443,295 B2* | 10/2008 | Brice et al. | 340/568.5 |
| 7,525,437 B2* | 4/2009 | Takeuchi et al. | 340/572.1 |
| 7,739,042 B2* | 6/2010 | Stiller et al. | 701/454 |
| 2001/0040512 A1* | 11/2001 | Hines et al. | 340/825.49 |
| 2002/0145038 A1* | 10/2002 | O'Hagan et al. | 235/383 |
| 2002/0170961 A1* | 11/2002 | Dickson et al. | 235/383 |
| 2004/0252025 A1* | 12/2004 | Silverbrook et al. | 340/568.5 |
| 2005/0140507 A1* | 6/2005 | Nam et al. | 340/539.13 |
| 2005/0149391 A1* | 7/2005 | O'Shea et al. | 705/14 |
| 2005/0187819 A1* | 8/2005 | Johnson | 705/14 |
| 2005/0200476 A1* | 9/2005 | Forr et al. | 340/539.13 |
| 2005/0218217 A1* | 10/2005 | Hasegawa et al. | 235/383 |
| 2005/0230472 A1* | 10/2005 | Chang | 235/383 |
| 2005/0253718 A1* | 11/2005 | Droms et al. | 340/572.1 |
| 2005/0253722 A1* | 11/2005 | Droms et al. | 340/572.1 |
| 2006/0092072 A1* | 5/2006 | Steiner | 342/46 |
| 2006/0125604 A1* | 6/2006 | Vaiana | 340/10.41 |
| 2006/0135183 A1* | 6/2006 | Zavada et al. | 455/457 |
| 2006/0149684 A1* | 7/2006 | Matsuura et al. | 705/65 |
| 2006/0163350 A1* | 7/2006 | Melton et al. | 235/435 |
| 2006/0200378 A1* | 9/2006 | Sorensen | 705/10 |
| 2006/0208888 A1* | 9/2006 | Patel et al. | 340/572.1 |
| 2006/0244588 A1* | 11/2006 | Hannah et al. | 340/539.13 |
| 2006/0287908 A1* | 12/2006 | Orumchian et al. | 705/10 |
| 2006/0289637 A1* | 12/2006 | Brice et al. | 235/385 |
| 2007/0008068 A1* | 1/2007 | Brice et al. | 340/5.91 |
| 2007/0120671 A1* | 5/2007 | Carmichael et al. | 340/572.1 |
| 2007/0126578 A1* | 6/2007 | Broussard | 340/572.1 |
| 2007/0143006 A1* | 6/2007 | Plettner | 701/207 |
| 2007/0188342 A1* | 8/2007 | Valeriano et al. | 340/825.49 |
| 2007/0229265 A1* | 10/2007 | Takeuchi et al. | 340/572.1 |
| 2007/0229274 A1* | 10/2007 | Patel et al. | 340/572.4 |
| 2008/0042836 A1* | 2/2008 | Christopher | 340/568.1 |
| 2008/0042840 A1* | 2/2008 | Christopher | 340/572.1 |
| 2008/0042844 A1* | 2/2008 | Christopher | 340/572.4 |

* cited by examiner

| NAME: FIREMAN #5 | | | LOG DATE: 27 JULY 2006 |
|---|---|---|---|
| BUILDING: ACME CORPORATE OFFICES | | | |
| BUILDING ADDRESS: 1313 FIRST AVE. | | | |
| NEW YORK, NY 1001 | | | |

| FLOOR | TAG# | TIME | LOCATION |
|---|---|---|---|
| 1 | 1-1 | 12:01:00 | ENTRANCE - WEST |
| 2 | 2-1 | 12:02:00 | STAIRWELL - WEST WALL |
| 3 | 3-1 | 12:03:00 | STAIRWELL - WEST WALL |
| 4 | 4-1 | 12:04:00 | STAIRWELL - WEST WALL |
| 4 | 4-50 | 12:04:10 | MAIN CORRIDOR - 50FT FROM WEST WALL |
| 4 | 4-100 | 12:04:20 | MAIN CORRIDOR - 100FT FROM WEST WALL |
| 4 | 4-150 | 12:04:30 | MAIN CORRIDOR - 150FT FROM WEST WALL |

SYSTEM AND METHOD FOR TRACKING SHOPPING BEHAVIORS

CROSS-REFERENCE TO RELATED APPLICATIONS

This application is a continuation of U.S. patent application Ser. No. 11/853,223, filed Sep. 11, 2007, which is a continuation-in-part of U.S. patent application Ser. No. 11/782,402, filed Jul. 24, 2007, which is a continuation-in-part of U.S. patent application Ser. No. 11/683,903, filed Mar. 8, 2007, which is (i) a continuation-in-part of U.S. patent application Ser. No. 11/505,616, filed Aug. 16, 2006, and (ii) a continuation-in-part of U.S. patent application Ser. No. 11/506,179, filed Aug. 16, 2006, all of which are incorporated herein by reference in their entirety.

FIELD OF THE INVENTION

The present invention relates generally to systems and methods for tracking shopping behavior, more particularly, to systems and methods for tracking traffic pattern in a store or other venue.

BACKGROUND OF THE INVENTION

Targeted advertisement is an effective strategy for selling products. Most advertisements on television are played in shows having viewers within a certain age group. For example, advertisements for toys are usually placed in children oriented programming such as early morning and after school cartoons. Similarly, advertisements for automobiles, for example, are usually placed in adult oriented programming such as news and talk shows.

Billboard advertisement also applies a targeted advertisement strategy. Cites for billboard advertisements are generally selected based on the traffic and the demographic of the travelers making up the traffic. In this way, the message of the advertisement is directed toward a desired audience.

Similarly, the same marketing strategies apply for the placement of products in a store such as, for example, a grocery store, a department store, and an electronic store. Product placement in a store can be a key factor in the sale of the product. A product placed in a high traffic area will most likely garner more attention from shoppers and thus will produce more sales than a product placed in a low traffic area.

SUMMARY OF THE INVENTION

According to various embodiments of the invention, systems and methods for tracking shopping behavior is provided. In accordance with one embodiment of the invention, the method comprises: emitting an RF interrogation signal using an interrogator relay unit ("IRU"); receiving, at the IRU, location data from an RFID tag in response to the RF interrogation signal; transmitting the location data, identification information of the IRU, and timestamp data to a remote server using the IRU; and generating a behavior report using the transmitted location data, the identification information, and the timestamp data. In one embodiment, the location data received from the RFID tag comprises information concerning where the RFID tag is located with respect to a reference point.

In one embodiment, the behavior report comprises a travel pattern of the IRU with respect to the reference point. The behavior report can be generated using location data from a plurality of RFID tags.

In another embodiment, the method calculates a time duration of the IRU being within a transmission range of the RFID tag by analyzing the timestamp data associated to the IRU identification information.

In yet another embodiment, RFID tag is a passive RFID tag. In still another embodiment, the plurality of RFID tags are located in a store. In one embodiment, the location data comprises location information of where the RFID tag is located within the store.

In still another embodiment, the IRU is located on a mobile container used for storing shopping materials.

In a further embodiment, the method comprises: transmitting the identification information of the IRU to a point-of-sale device; and transmitting purchaser information and items purchased information to the remote server once a sale transaction is completed using the point-of-sale device.

In yet another embodiment according the present invention, a method for tracking an interrogator relay unit (IRU) comprises: emitting RF interrogation signals at a prescribed interval using the IRU; receiving, at the IRU, location data from a plurality of RFID tags in response to the periodic RF interrogation signals; transmitting each of the received location data and identification information of the IRU to a remote server using the IRU; calculating time duration information of the IRU being within a transmission range of a first RFID tag using the prescribed interval and a number of times the location data from the first RFID tag is being transmitted along with the identification information of the IRU.

In yet another embodiment according the present invention, a system for tracking shopping behavior is provided. The system comprises: a plurality of RFID tags distributed within a structure, each RFID tag configured to contain location information regarding its position within the structure; a interrogator relay unit (IRU) configured to receive the location information from the plurality of RFID tags in response to interrogation signals transmitted by the IRU, wherein the IRU is configured to transmit the location information and an identification information of the IRU to a remote database; and a report generator configured to query the remote database and to generate a behavior report that comprises a travel pattern of the IRU with respect to the plurality of RFID tags. In the system, the remote database is configured to store and timestamp the location information received.

Other features and advantages of the present invention should become apparent from the following description of the preferred embodiments, taken in conjunction with the accompanying drawings, which illustrate, by way of example, the principles of the invention. The summary is not intended to limit the scope of the invention, which is defined solely by the claims attached hereto.

BRIEF DESCRIPTION OF THE DRAWINGS

Embodiments of the present invention will now be described, by way of example only, with reference to the following drawings, in which.

DETAILED DESCRIPTION OF THE PREFERRED EMBODIMENTS

Figure 1:
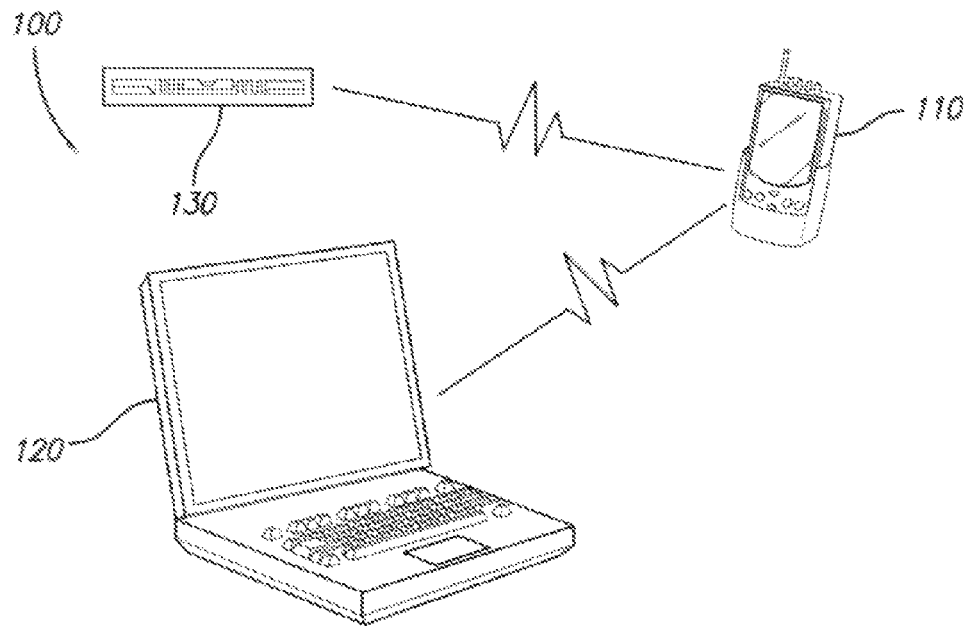
FIG. 1 is a notional illustration of an example RFID system for locating an entity within a structure, in accordance with the principles of the present invention.

Before describing the invention in detail, it is useful to describe an example environment in which the invention may be implemented.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to systems and methods for obtaining location-based data on a mobile device. The method may comprise receiving location data from an RFID tag using the mobile device, transmitting identification data of the mobile device and the location data to a remote system, receiving customized data from the remote system, wherein the customized data are based on the location data from the RFID tag and the device ID, and presenting the customized data on the mobile device.

By way of example, the entity may comprise a person or an item that is located within a structure such as a building, a subway, or a mine. More particularly, the entity is fitted with a portable RFID transmitter/receiver, and the structure is provided with a plurality of RFID tags. Each RFID tag may comprise a passive or active device that transmits its location to the transmitter/receiver. The transmitter/receiver then transmits the location of the entity to a base unit computer, which displays the location of the entity. In this manner, the RFID system of the invention may continuously monitor the location of any entity that is fitted with a transmitter/receiver. By continuously monitoring the location of an entity that is fitted with a transmitter/receiver, the entity may be tracked. This tracking may occur almost any time two or more locations for the same entity are determined.

In conventional systems, an RFID tag is attached to the entity such that the tag may move past a stationary RFID receiver, referred to as an "interrogator", and the system records the information from the tag. There are several proposals for use of RFID technology in buildings or for emergency personnel. Such stationary systems require installation of RFID interrogators throughout buildings to accurately track personnel locations, which may be incredibly expensive and impractical, particularly when considering that the interrogators are far more expensive than the RFID tags. In addition, the interrogators require emergency backup power when there is a loss of power to the building. In the RFID system of the present invention, the process is reversed so that a plurality of stationary RFID tags are positioned at predetermined locations throughout structures such as buildings and subways, wherein each stationary tag identifies the location of an entity within the structure. In view of the high relative cost of the conventional stationary RFID receivers, placing RFID tags throughout the building and only requiring a limited number of emergency personnel to wear an RF transmitter/receiver will result in an enormous cost savings, particularly for large structures.

Referring to FIG. 1, in accordance with the principles of the invention, an RFID system 100 for locating an entity within a structure comprises one or more portable radio frequency (RF) transmitter/receiver units 110, a base unit 120 providing a command and control function, and a plurality of passive RFID tags 130. According to other embodiments described herein, active RFID tags 130 may be employed. The base unit 120 may comprise a computer including a processor, a memory, an operating system, a database, an HMI, and an RF receiver. The RF receiver may comprise a PC card on the motherboard or a PCMCI card or with a USB interface, including interface software comprising machine readable instructions for allowing communication between the RF transmitter/receiver 110 and the base unit receiver, and then unpacking the data transmissions and load records to a database (not depicted). In one embodiment the portable RF transmitter/receiver unit 110 is battery-operated, wherein the battery life is sufficient for the duration of an operation.

According to the invention, the RF transmitter/receiver 110 may read an RFID tag 130 and thereby determine location based on the known location of the RFID tag 130. The location of RFID tag 130 may be determined by location data embedded in RFID tag 130. The embedded location data may be programmed into RFID tag 130 using clear text or other suitable languages. The location data may include the floor number and location within the floor, latitude, longitude, elevation, and/or other location information. In a preferred implementation, the RF transmitter/receiver 110 may determine location information using other location determination systems and methods. For example, in the preferred embodiment of the invention, the RF transmitter/receiver 110 is capable of reading an RFID tag 130 and receiving GPS signals from GPS satellites. Generally, RFID tags 130 are used to track entities within buildings, underground, etc., while GPS is employed to determine location outside. It will be understood, however, that in certain cases GPS signals may be receivable inside (e.g., near a window), and in other cases RFID tags may be employed to determine location outside (e.g., RFID tags 130 may be attached to the exterior of buildings). Such a system may be useful in extremely dense urban areas where GPS signals may be blocked by tall buildings or interfered with by other electromagnetic signals.

Since the RFID system 100 of the invention broadcasts location data in real time, the location of the person (or entity) is recorded at the base unit 120. Using the location data, rescue personnel may be immediately directed to the real time location of the entity within a structure, and the man-portable unit does not need to continually function as a beacon. By way of example, the structure may comprise a building, subway or mine. One of ordinary skill in the art will appreciate that the RFID system 100 may be employed to locate entities within various other structures without departing from the scope of the invention.

While the supplemental location determination device will generally be GPS, other location determination systems may also be used. Further, the supplemental location determination system may be augmented by, for example, Local Area Augmentation System (LAAS), Wide Area Augmentation System (WAAS), Differential GPS (DGPS), etc. Additionally, as used herein GPS refers to the Global Navigation Satellite System (GNSS) developed by the United States Department of Defense, (NAVSTAR GPS) and any other similar GNSS, for example, Galileo, GLONASS, etc. Additionally, while the supplemental location determination system is referred to as "supplemental" it will be understood that, in some cases, it may provide location information more frequently than the RFID entity location system. Such cases include instances wherein the entity to be tracked spends more time in areas where GPS signals may be received than in areas where RFID tag signals may be received.

Figure 2:
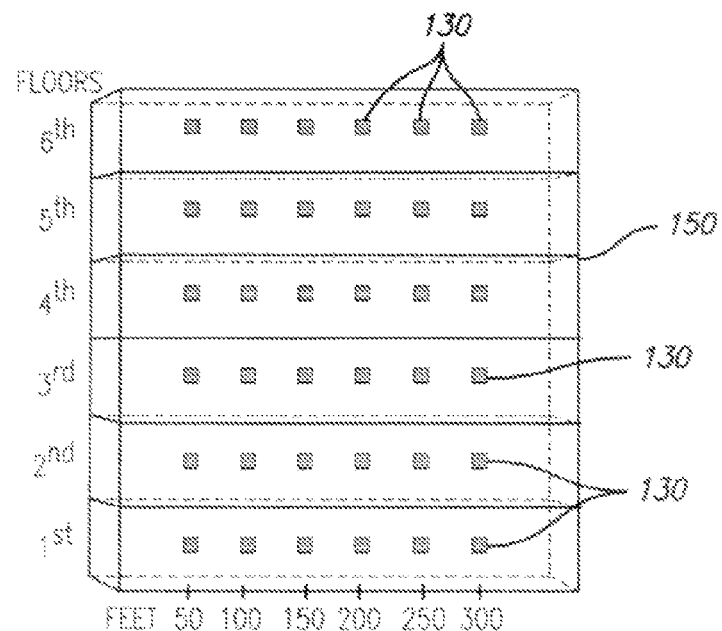
FIG. 2 is a schematic diagram illustrating an exemplary implementation of the RFID tags of FIG. 1 within a six-story structure.

FIG. 2 illustrates a schematic view showing the implementation of the RFID system 100 of the invention within a six-story structure 150. Specifically, the RFID system 100 comprises a plurality of passive RFID tags 130 disposed at predetermined intervals within the six-story structure 150. In the illustrated embodiment, the passive RFID tags 130 are separated by intervals of approximately fifty feet. Additional tags 130 may be provided at other locations within the structure 150, for example at entrances, exits, stairwells, particular rooms, or every room in the structure 150. According to the invention, a standard may be developed to determine an appropriate or optimum distance between passive tags 130 for a particular structure. According to one implementation of the invention, the RFID tags 130 are passive devices such that they do not require AC or DC power, and each tag 130 has an RF signal containing unique location information. In operation, an RF transmitter/receiver (attached to an entity within the structure 150) sends a signal to an RF tag 130 and then records the RF backscatter signal of the tag 130. The RF signal of the tag 130 may include unique location information. As set forth above, the RFID system 100 has many additional useful applications such as with respect to mining operations, hospitals, in underground parking garages, and other business where one needs to quickly locate people or assets, particularly during an emergency situation.

According to a further embodiment of the invention, active RFID tags 130 may be employed within the RFID system 100. In this embodiment, the base computer 120 emits an RF interrogation signal at predetermined, constant, rapid intervals. Once the base computer 120 enters the effective range of an active RFID tag 130, the active tag 130 receives the request and transmits radio waves including signals representing building data, such as the address of the building, contact information, and/or a schematic of the building. Upon receiving the building data, the base unit computer 120 stores the building data, and displays the building data on a human-machine interface ("HMI") such as a graphical user interface ("GUI"). Unlike the passive tags, the active tags of this embodiment require an AC or DC power source.

In one embodiment RFID tags may be placed within building materials. In another embodiment RFID tags may be attached to building materials during the manufacture of these materials. In yet another embodiment RFID tags may be attached during the construction of a building. In this way RFID tags may be propositioned in or on building materials to expedite the installation of tags within buildings. For example, building materials that may contain tags include drywall or sheetrock, baseboards, wallpaper, fabric, plywood, concrete, stucco, or plaster. In another embodiment tags may also be placed within pre-manufactured walls and/or modular furniture during the manufacture of these items.

Figure 3:
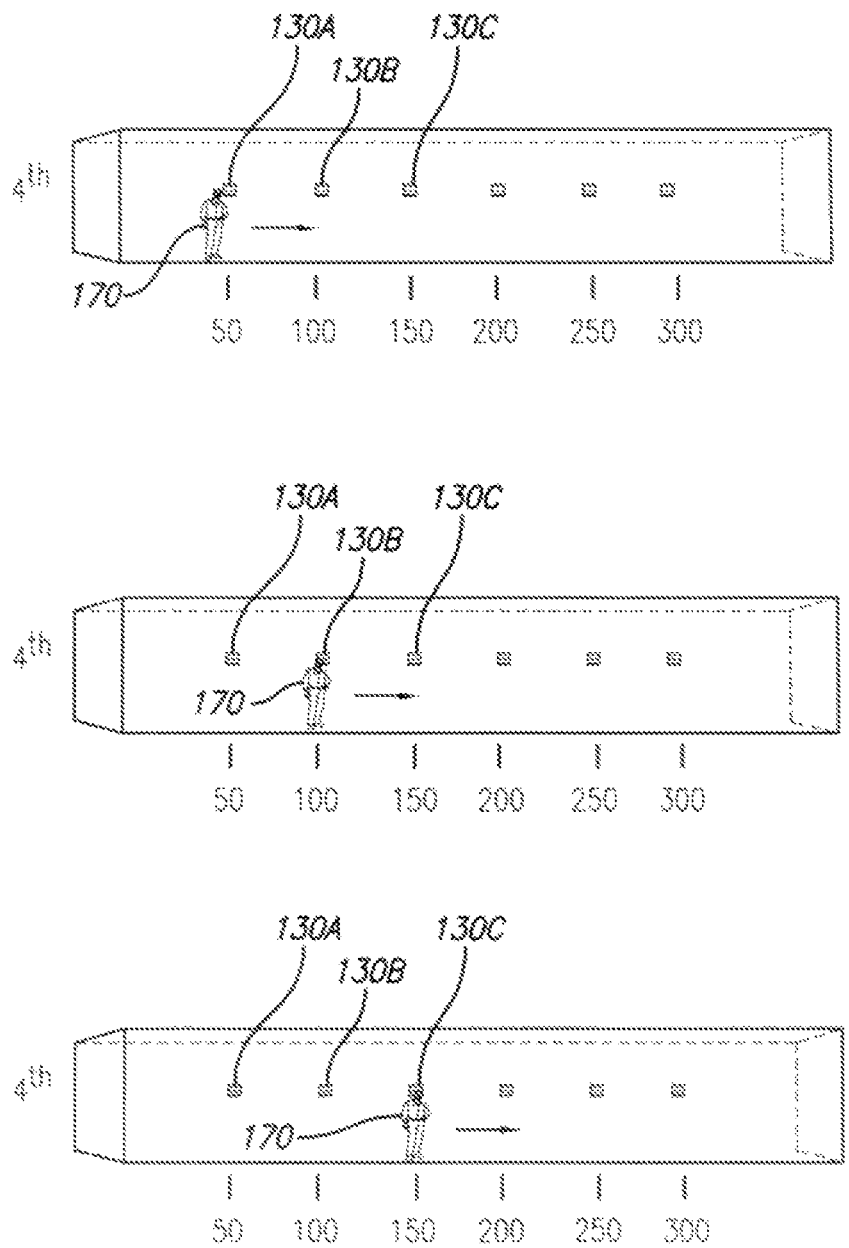
FIG. 3 is a schematic diagram illustrating the progression of a fire fighter through the structure passing RFID tags while wearing a portable RFID transmitter/receiver (also herein referred to an interrogator relay unit ("IRU"))

FIG. 3 is a schematic view that depicts the progression of a fire fighter 170 past the RFID tags 130, wherein the fire fighter 170 is wearing a portable RFID transmitter/receiver unit 110. As the fire fighter 170 walks past an RFID tag 130, the RF transmitter/receiver 110 records the location of the tag 130 and broadcasts the location of the tag 130 (and the fire fighter 170) to the base unit computer 120, which maintains a log of the current location of each RF transmitter/receiver 110 on an on-going basis. Locations are updated every time an RF transmitter/receiver 110 passes an RF tag 130 at constant, predetermined and rapid intervals. Alternatively, locations are updated when an RF transmitter/receiver 110 passes a predetermined number of RF tags 130, or at a predetermined time interval. As such, the base unit 120 records the location of each entity (or fire fighter) that is accurate to the distance between RFID tags 130. In FIG. 3, the fire fighter 170 is illustrated as moving past RF tags 130 on the fourth floor of the structure 150 of FIG. 2. In the first frame, the fire fighter 170 passes the RFID tag 130A positioned at 50 feet from the left wall on the fourth floor of the structure. In the second frame, the fire fighter 170 walks past the tag 130B at 100 feet from the left wall. In the third frame, the fire fighter 170 passes the RFID tag 130C located 150 feet from the left wall. As the fire fighter 170 passes each RF tag 130, his personal RFID transmitter/receiver 110 records its location and forward the location to the base unit 120, which track the location in a log.

Figures 4, 5:
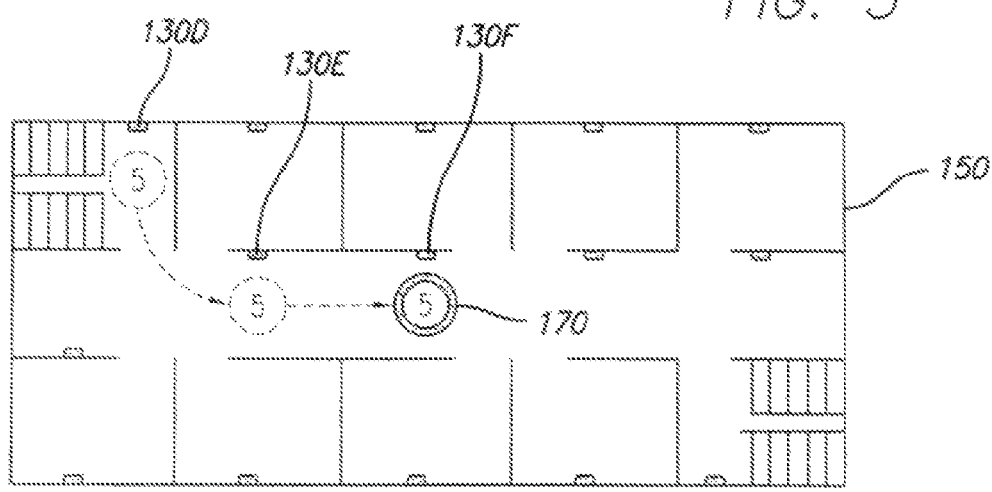
FIG. 4 illustrates a notional base unit log that details the fire fighter's location within the structure over time as the fire fighter moves through the structure.
FIG. 5 is a detailed sectional view of the $4^{th}$ floor of the structure illustrating the movement of the fire fighter through the structure.

FIG. 4 illustrates a base unit log 190 that details the fire fighter's location within the structure 150 over time as the fire fighter 170 moves through the structure 150. Particularly, the initial entry in the base unit log 190 was recorded as the fire fighter 170 entered the structure 150, passing an RFID tag 130 at the entrance. According to the invention, this particular entrance tag 130 may contain general information about the building such as address, the building's contact information, the building owner's contact information, the number of floors, and/or a schematic of the building. In the illustrated embodiment, the base log 190 contains information pertaining to the identification of the fire fighter 170, the contact information of the structure 150, the address of the company or companies residing in the structure 150, the entity's position and time for each log entry, and the current date. The base unit log 190 then recorded the fire fighter's locations in real time as he or she traveled to the fourth floor via the stairwell, passing several more tags 130. The fire fighter 170 then exited the stairwell on the fourth floor, and the three highlighted entries in the base unit log 190 coincide with the movement of the fire fighter 170 illustrated in FIG. 3.

According to the invention, it is anticipated that the efficacy of the RFID system 100 will dramatically increase if an entire metropolitan area adopts a set of standards and associated regulations, for example, to require the installation of RF tags in all multi-story buildings, subways, and in all mines. In one embodiment, if all building owners were required to install RFID tags in a uniform manner, emergency personnel would be assured of consistency from building to building and accuracy of the location data at each specific building. By way of example, a standard for the spacing between tags may be adopted to ensure consistent data from building to building. Greater resolution may be realized by reducing the distance between RFID tags.

FIG. 5 illustrates a detailed sectional view of the 4$^{th}$ floor of the structure 150 for identifying and displaying the movement of specific personnel (e.g., the fire fighter 170) as they move through the structure 150. With the adoption of an entrance RFID tag 130, emergency personnel may download a schematic of the structure 150 to the base unit 120 to display a "bird's-eye" view or other views of any floor or multiple floors of the structure 150 and the position of any fire fighter 170 within the structure. The schematic is updated to show the movement of the fire fighter 170 every time he or she passes an RFID tag 130. In the illustrated embodiment, emergency personnel No. 5 (fire fighter 170) has recently moved from the stairwell on the 4$^{th}$ floor (RFID tag 130D), past RFID tag 130E, and is currently positioned near RFID tag 130E.

The RFID system of the invention may be implemented utilizing Commercial, Off-The-Shelf ("COTS") technology currently manufactured and sold by various companies. In particular, RFID tags and personal computers are readily available at any number of global suppliers. The base unit of the RFID system may further require a database for storing and retrieving information as well as a graphic user interface ("GUI") for displaying the retrieved information. RFID interrogators that collect the data from an RFID tag and transmit the data via cable to a computer for processing are currently available. Additionally, manufacturers currently produce hand-held interrogators that collect data, and then download the data at a later time when the interrogator is placed in a cradle connected to a computer. For the RFID system set forth herein, a new type of portable interrogator is necessary that is capable of transmitting the recorded data to the base unit in real time. In one embodiment the unit is battery-operated, portable, as light weight as possible, and protected from the elements.

Figure 6:
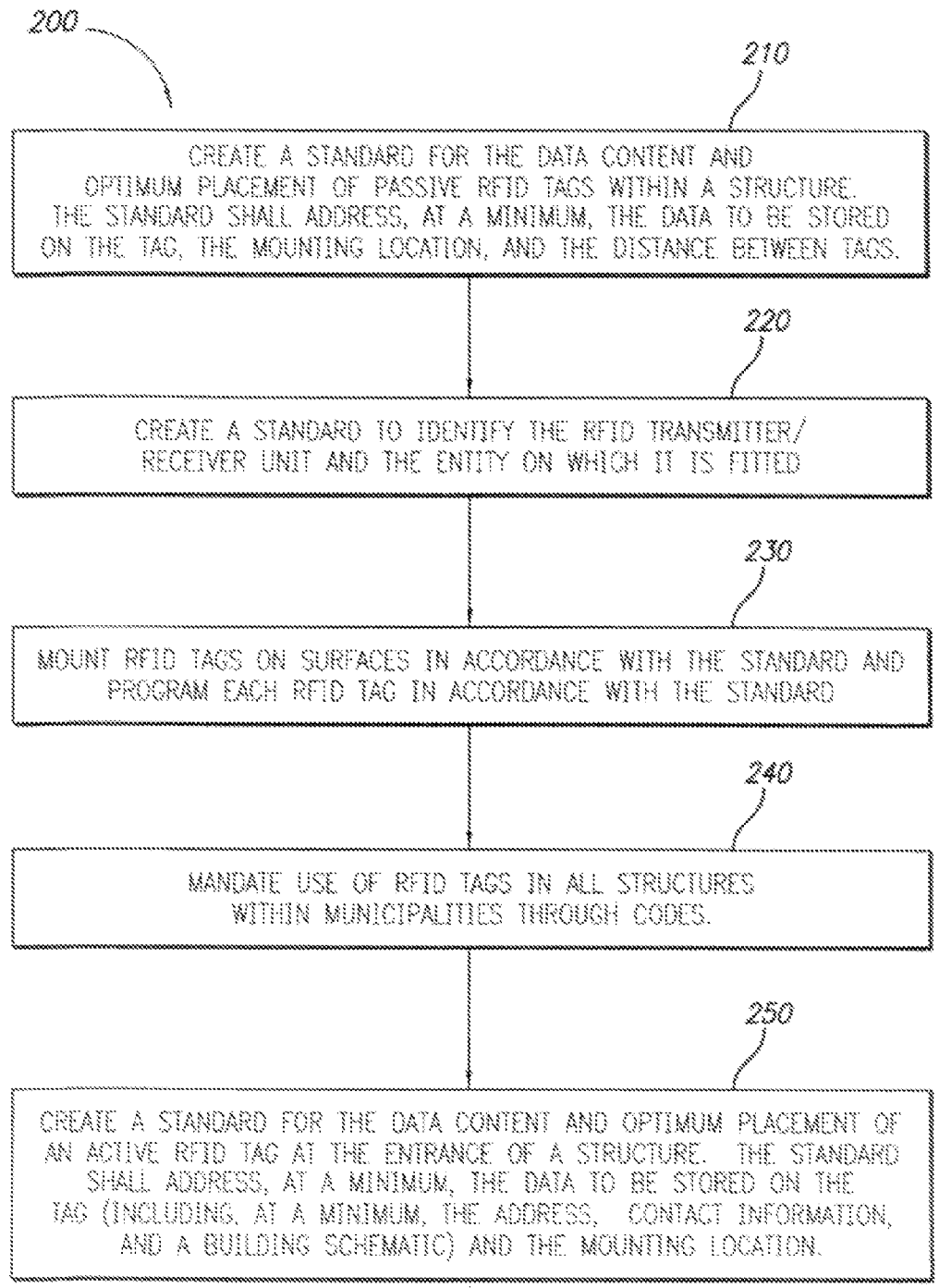
FIG. 6 is a flowchart illustrating an example method for standardizing RFID function and location for the RFID system, in accordance with the principles of the present invention.

Referring to FIG. 6, a method 200 for standardizing RFID function and location for the RFID system of the invention will now be described. Initially, step 210 involves creating a standard for the data content and optimum placement of passive RFID tags 130 within a structure. At a minimum, the standard should address the data to be stored on the tag 130, the mounting location of the tag 130 and the distance between tags 130. Step 220 involves creating a standard for identifying the RFID transmitter/receiver unit 110 and the entity (or person) on which the unit 110 is fitted. This step may involve programming each RFID transmitter/receiver unit 110 to identify the individual, asset or entity to which it will be attached. Subsequently, step 230 involves mounting a plurality of RFID tags 130 on surfaces of the structure in accordance with the standard and programming each RFID tag 130 in accordance with the standard (i.e., using an RFID transmitter/receiver unit 110 to program the location data into the tags 130). According to some embodiments of the invention, the method may further entail the steps of: (1) mandating the use of RFID tags in all structures of a particular municipality (step 240); and/or (2) creating a standard for the data content and optimum placement of an RFID tag 130 at the entrance of a structure (step 250). This standard addresses the mounting location and the data to be stored on the tag, including the address, contact information, and a building schematic.

Figure 7:
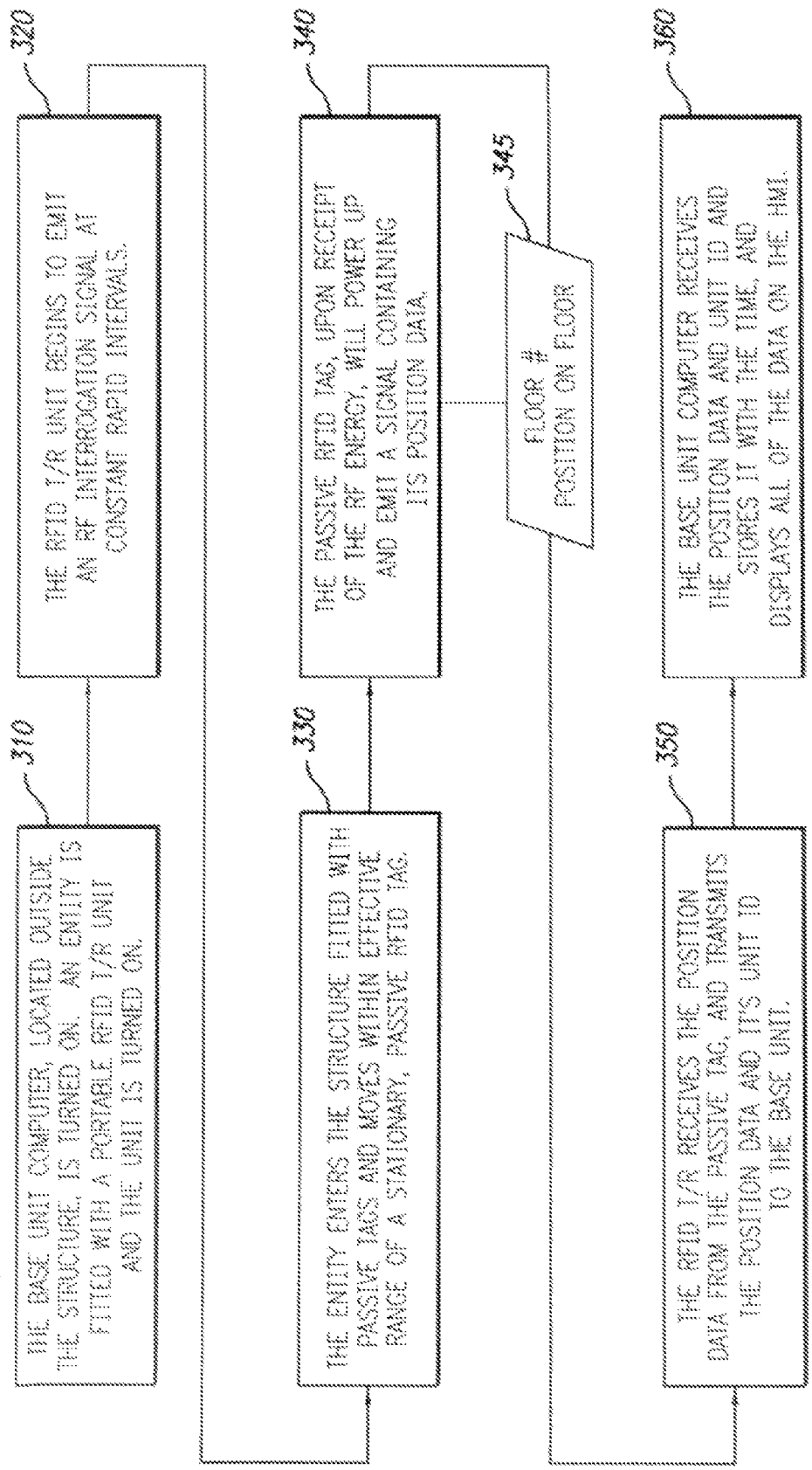
FIG. 7 is a flowchart illustrating an example method for data transmission from a passive tag to the RFID transmitter/receiver and to the base unit, in accordance with the principles of the present invention.

Referring to FIG. 7, a method 300 for data transmission from a passive tag 130 to an RFID transmitter/receiver unit 110 and to the base unit computer 120 will now be described. In step 310, the base unit computer 120 (which may be located inside or outside of the structure) is turned on and an entity (or person) is fitted with a portable RFID transmitter/receiver unit 110. In step 320, the portable RFID transmitter/receiver unit 110 emits an RF interrogation signal at constant, predetermined and rapid intervals. Step 330 involves the entity entering the structure fitted with passive RFID tags 130 and moving within the effective range of a stationary RFID tag 130. Upon receipt of the RF energy by the RFID tag 130, the method 300 proceed to step 340, wherein the passive tag 130 powers up and emits a signal 345 (or a series of signals) containing the location data, which may include, e.g., the floor number and location within the floor, latitude, longitude, and elevation, or other location information, such as a tag serial number that may be mapped to a location. For example, in one embodiment information about location based on tag serial number may be stored in a database. When a tag serial number is received this location information may be looked up in the database.

This may occur, for example, at an interrogator, at a base unit, or where ever the tag serial number is received and a copy of the data base is available. The tag number may be received by a device that contains the database either directly from an RFID tag or it may be transmitted from another device. For example an interrogator may transmit an RFID tag serial number to a base unit that includes a copy of the database. In step 350, the RFID transmitter/receiver unit 110 receives the location data from the passive tag 130, and transmits the location data and its unit ID to the base unit 120. In step 360, the base unit computer 120 receives the location data and unit ID, stores this information with the time, and displays all of the data on the HMI.

Figure 8:
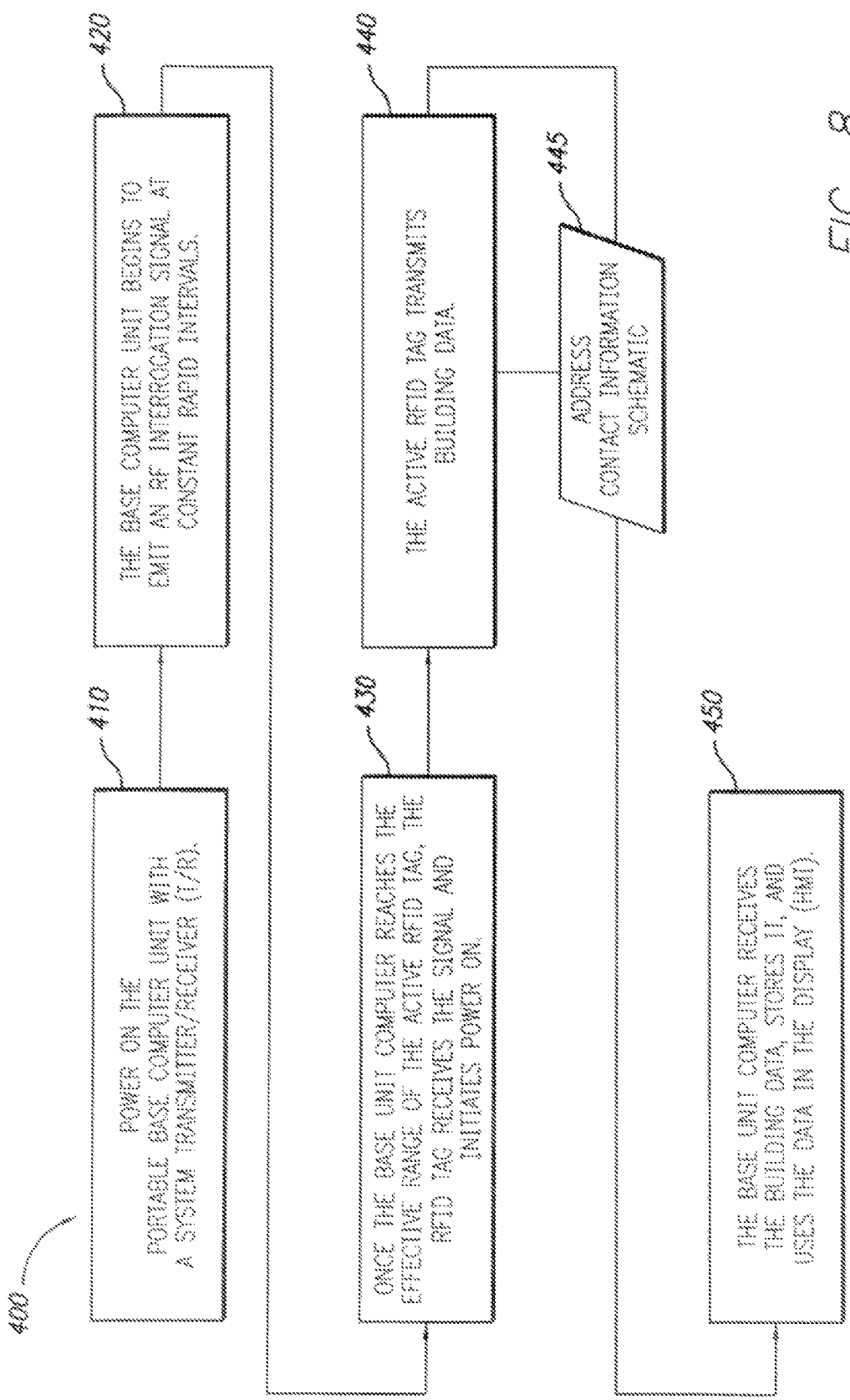
FIG. 8 is a flowchart illustrating an example method for downloading building data from an active RFID tag to the base unit computer, in accordance with the principles of the present invention.

Referring to FIG. 8, a method 400 for downloading building data from an active RFID tag 130 to a base unit computer 120 having a system transmitter/receiver will now be described. Step 410 involves powering on the portable base unit 120. In step 420, the base computer 120 begins to emit an RF interrogation signal at predetermined, constant, rapid intervals. Once the base computer 120 enters the effective range of the active RFID tag 130, the method proceed to step 430, wherein the active tag 130 receives the signal and powers on. In step 440, the active RFID tag 130 transmits building data in the form of a signal 445 (or a series of signals). For example, the building data may include without limitation, the address of the building, contact information, and a schematic of the building. In step 450, the base unit computer 120 receives the building data, stores the building data, and displays the building data on the GUI.

Figure 9:
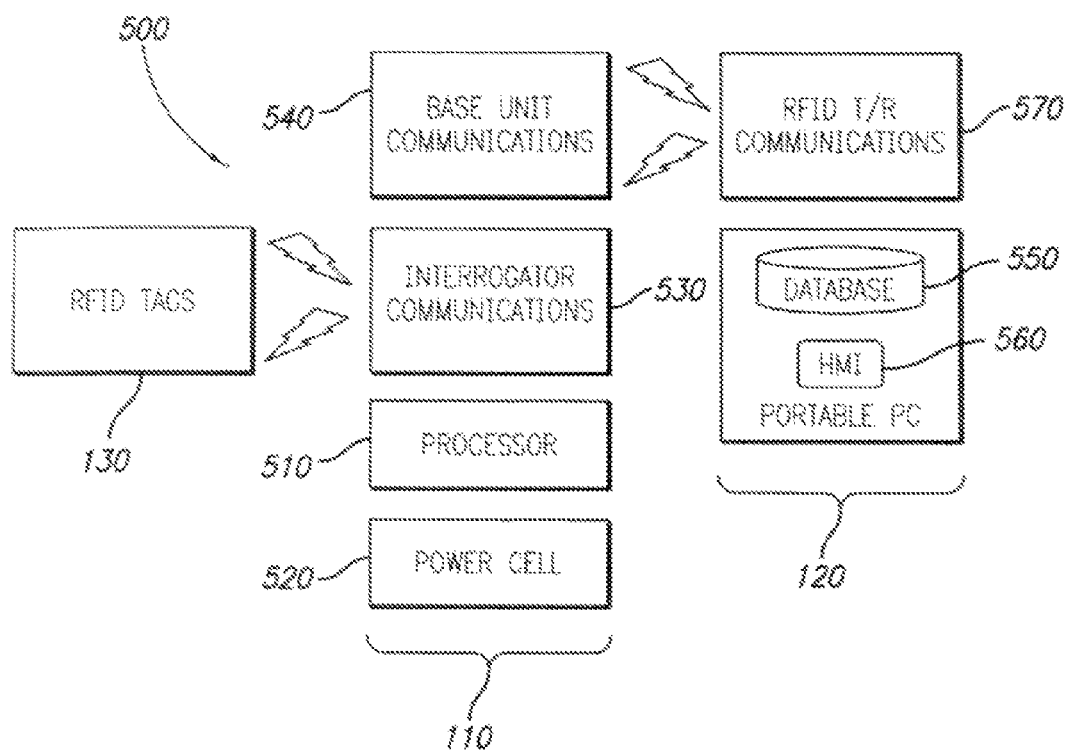
FIG. 9 is an exemplary block diagram illustrating the major components and radio wave communication between the components of the RFID system of the invention.

FIG. 9 is an exemplary block diagram 500 of the major components illustrating radio wave communication between the components of the RFID system 100, including RFID tags 130, RFID transmitter/receiver 110 and base unit computer 120. The portable RFID transmitter/receiver 110 comprises a processor 510, a power cell 520, interrogator communications 530 for interrogating the RFID tags 130, and base unit communications 540 for sending data to the base unit computer 120. The base unit 120 comprises a portable computer including at least one database 550, an HMI 560, and RFID transmitter receiver communications 570 for receiving data from the portable RFID transmitter/receiver 110. As would be understood by those of ordinary skill in the art, many additional system configurations are possible without departing from the scope of the invention.

Figure 10:
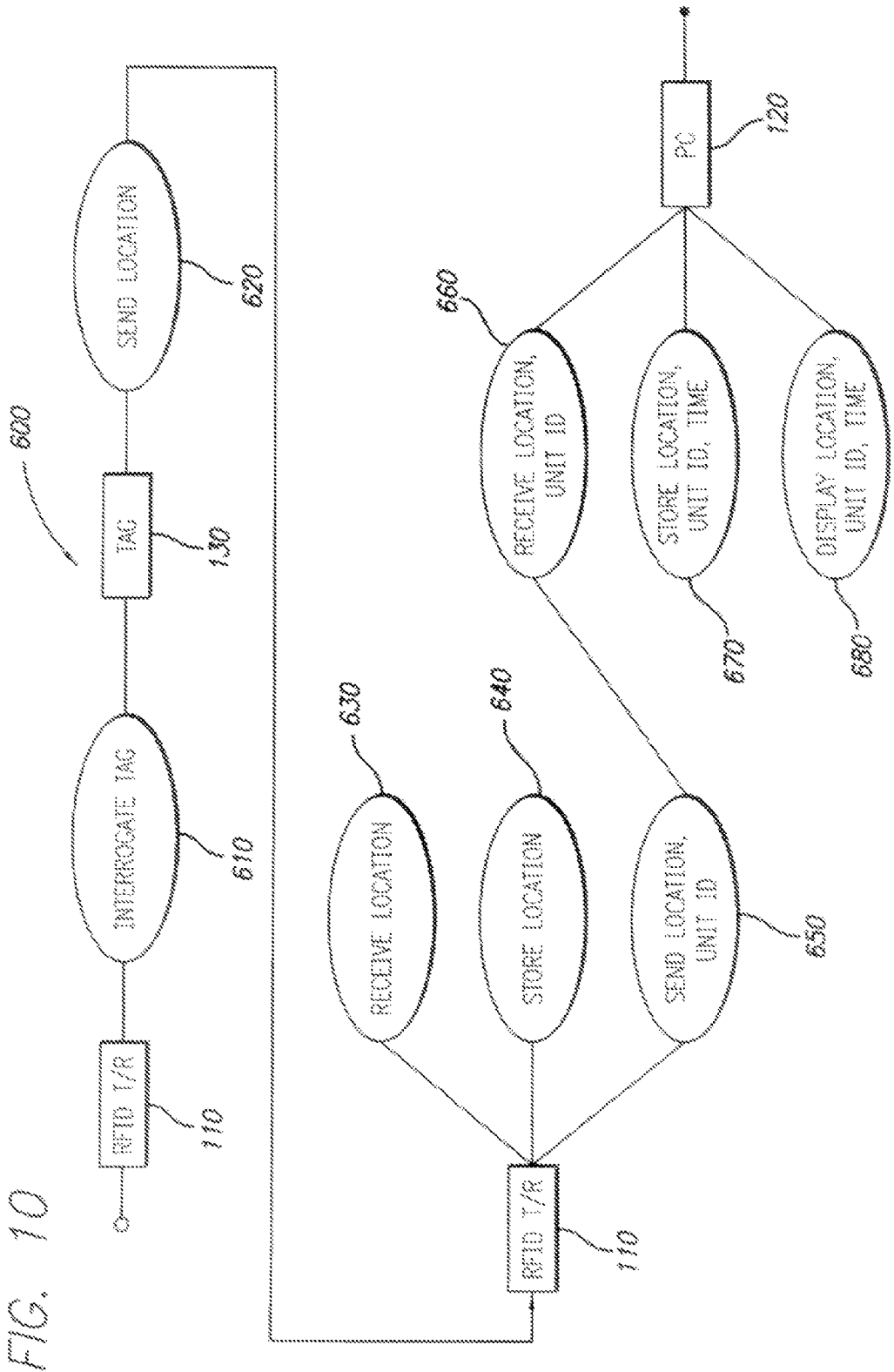
FIG. 10 is an exemplary process flow diagram illustrating process communication within the RFID system of the invention.

FIG. 10 is an exemplary process flow diagram 600 illustrating process communication within the RFID system 100 of the invention. In particular, the RFID transmitter/receiver 110 interrogates an RFID tag 130 (process 610), and, in response, the RFID tag 130 sends its location and RFID tag unit identification to the RFID transmitter/receiver 110 (process 620). Upon receiving the location information (process 630), the RFID transmitter/receiver 110 stores the location (process 640) and sends the location and RFID tag unit identification to the base unit computer 120 (process 650). The base unit 120 receives the location and RFID tag unit identification (process 660), stores the location, RFID tag unit identification and the time of the data entry (process 670), and displays the location, RFID tag unit identification and the time of the data entry (process 680). Other process flow arrangements are possible without departing from the scope of the invention.

The present invention has been described above in terms of presently preferred embodiments so that an understanding of the invention may be conveyed. However, there are other embodiments not specifically described herein for which the invention is applicable. Therefore, the invention should not be seen as limited to the forms shown, which is to be considered illustrative rather than restrictive. For example, the systems and methods described herein have been described with respect to example embodiments wherein RFID tags 130 are disposed at predetermined intervals within a structure. As would be understood by those having ordinary skill in the art, in other embodiments, RFID tags 130 may be disposed at intervals that are not predetermined. Further, the RFID tags 130 do not have to be placed at a particular interval. Additionally, the distance between RFID tags 130 does not have to be predetermined or constant. The locations may be determined after the RFID tags 130 have been placed. The placement of one or more RFID tags 130 is all that is necessary. As long as the location of an RFID tag is known, an entity may be located if it is within the range of the particular RFID tag 130.

Generally, the more accurately the location of an RFID tag 130 is known, the more precisely an entity may be located. As the range of the RFID reader on the entity increases, the accuracy may decrease because the RFID reader may determine that the entity is located at a tag that is actually some distance away from the tag. In some embodiments of the invention, accuracy may be improved by the addition of more RFID tags 130 such that the predetermined distance between RFID tags 130 is reduced. Accordingly, as would be understood by those of ordinary skill in the art, the "exact location" of an entity being located is subject to the accuracy limitations of the systems and methods described herein.

The present invention provides systems and methods for tracking entities (e.g., people, things), wherein the entities may be tracked as they move, both inside and outside of structures. The structures may be terrestrial (e.g., buildings) and subterranean (e.g., mines, subways). The location of entities that are not moving (e.g., at least temporarily still) may also be determined. Location, or tracking, data may be integrated with other relevant data, including without limitation, (i) ancillary tracking systems (e.g., GPS, acoustic homing), (ii) local environmental conditions, (iii) local infrastructure (e.g., electrical wiring, plumbing, (iv) hazardous material), (v) personal data (e.g., temperature, heart rate), and (vi) geospatial support data including maps, images and features (e.g., roads, bridges, railroads, communication lines). In some embodiments infrastructure data may include national, state, local, or tribal infrastructure data.

In one embodiment the data may be observed almost anywhere on Earth through connectivity with the interne or by wireless communication such as satellite, cellular, or other wireless communication systems, including combinations of multiple communication systems. Observers may use multiple methods for data presentation. For example, the collection of interior positioning system ("IPS"), exterior position system ("EPS"), or both, may be provided by a web based service which may be used by subscribers. In some embodiments, the location information may be used in conjunction with mapping services, for example Google Earth, Microsoft Virtual Earth, Google Maps, Yahoo Maps, or other mapping services. In another embodiment the mapping information may be integrated into the web based service.

It will be understood that IPS will generally refer to the positioning system for inside a structure, mine, parking garage, etc., (e.g., an RFID based system) while EPS will generally refer to the position system for outside, (e.g., GPS). These terms are not intended to be limiting, however. For example, an RFID system may be used outside (e.g., by attaching RFID tags to the outside of a building), and in some cases GPS me be able to be used inside, e.g., near windows, skylights, openings, etc.

The systems and methods described herein may be implemented in many different types of devices. For example, the system may incorporate use of presentation devices that may include SmartPhones, PDAs, laptops, personal computers and thin client browsers. Other presentation devices may include local display of data where presentation services are included in the Interrogator Relay Unit ("IRU") or Smart IRU.

Figure 11:
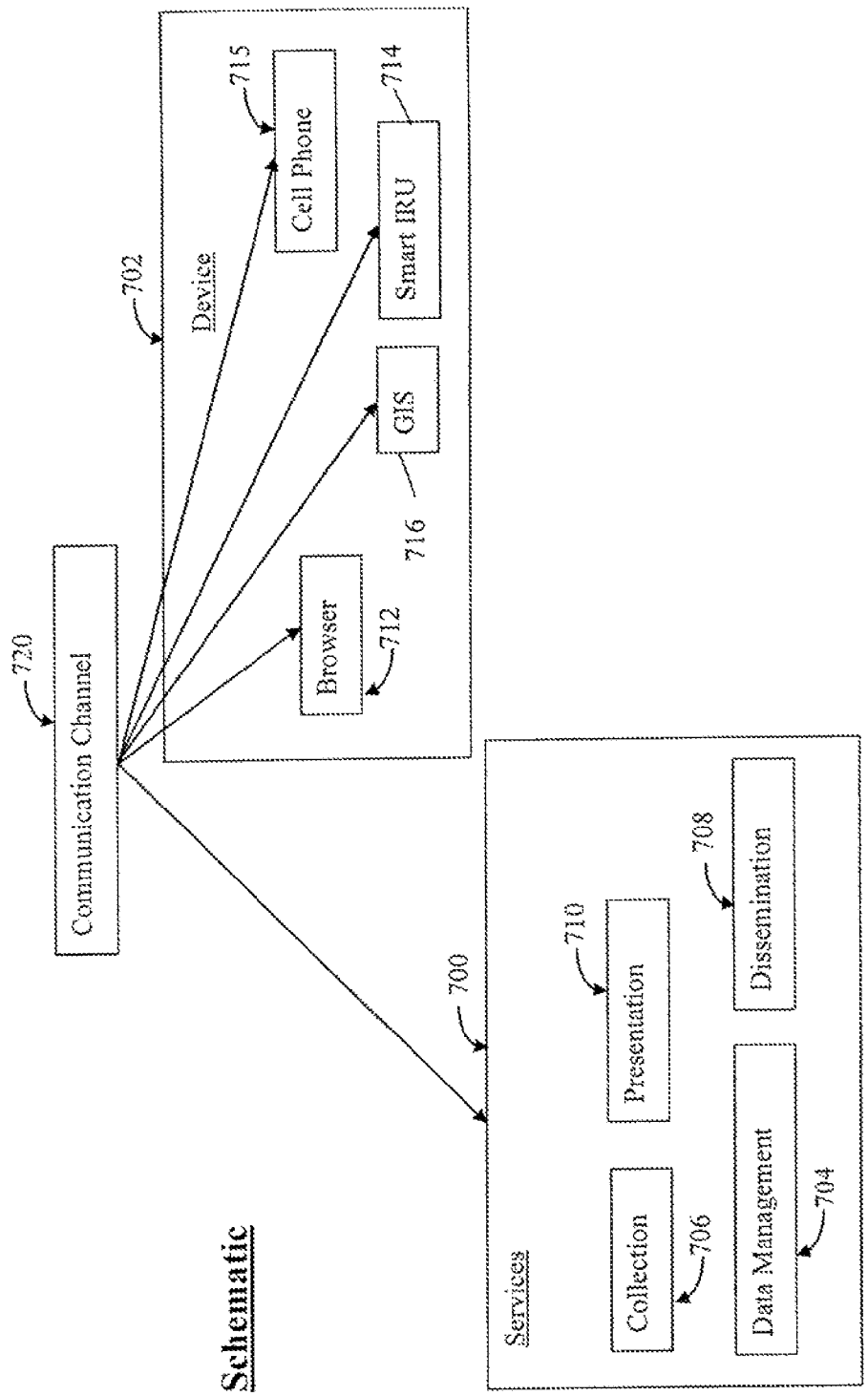
FIG. 11 is a diagram illustrating the systems and methods described herein from a service view perspective and a display view perspective according to embodiments of the present invention.

Referring now to FIG. 11, the systems and methods described herein will now be discussed from a service view perspective 700 and a display view perspective 702. In particular, the service view 700 illustrates the architectural concepts, whereas the display view 702 illustrates operational concepts and potential implementations or embodiments. In other words, the service view 700 depicts various systems and methods described herein from the perspective of the services, while the display view 702 depicts various systems and methods described herein in terms of different example devices that may be employed. It will be understood that these are not the only devices that may be used to implement the systems and methods described herein. It will be further understood that the systems and methods described herein may, in some cases, be useful for providing services in addition to or in place of the example services discussed.

In the service view perspective 700, the architecture may be broken down into data management 704, collection 706, dissemination 708, and presentation 710. Conceptually, these elements could be services in a service-oriented architecture ("SOA"), where functionality and data flow are orchestrated by workflow middleware. The display view 702 may include different implementations or embodiments of elements of the service view 700. The spectrum of devices may range from a simple browser 712 to a smart IRU 714 that interrogates, relays location and other data to a base unit and also displays results locally to the host. In addition, the display view 702 may include a GIS 716 and/or a cell phone 718. Data can be transmitted and received between various components 712, 714, 716, and 718 and the services 700 using communication channel 720.

Figure 12:
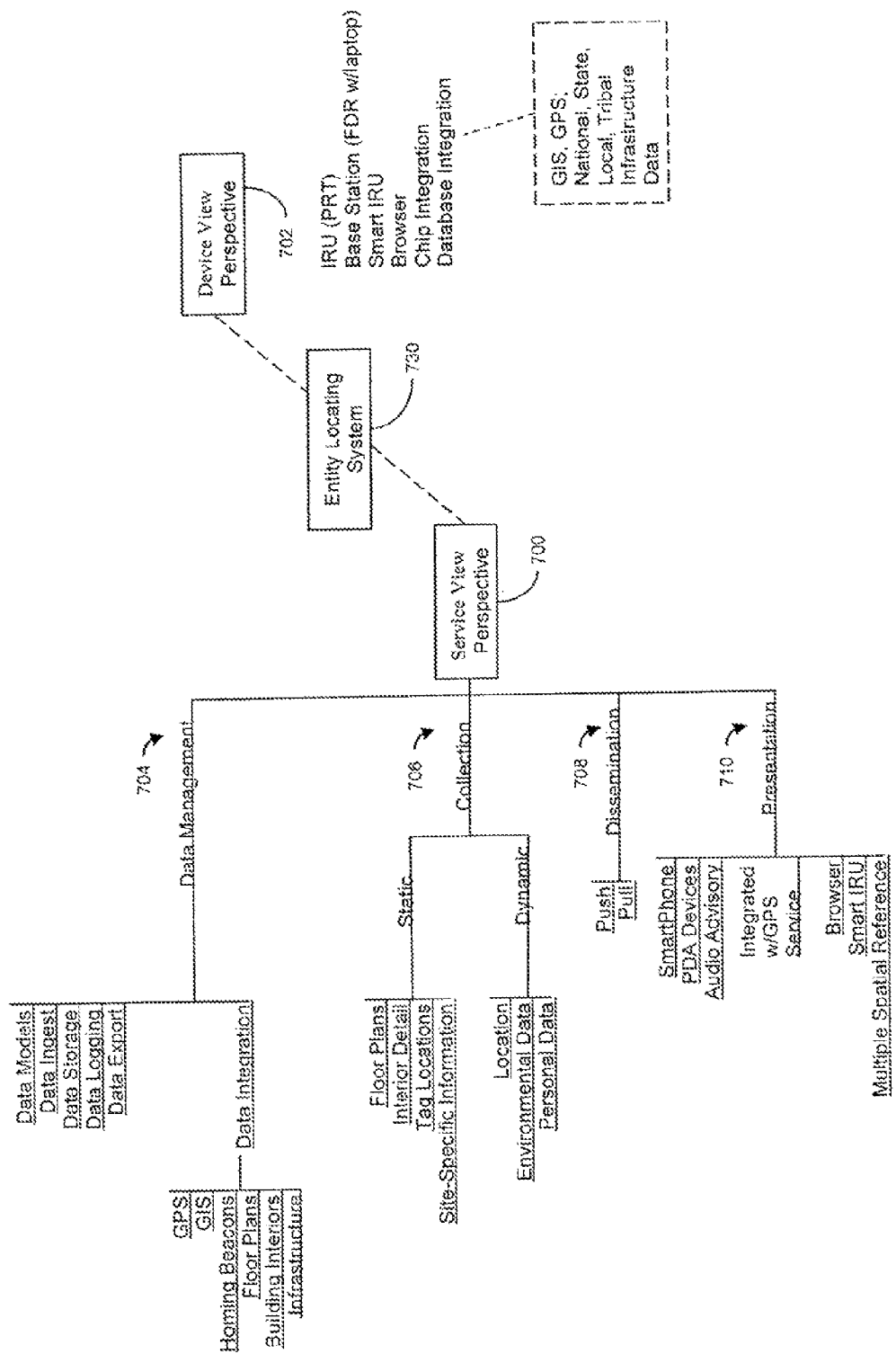
FIG. 12 is a diagram illustrating an exemplary embodiment of the entity location system in accordance with the service view perspective and the display view perspective of FIG. 11 according to embodiments of the present invention.

FIG. 12 is a diagram illustrating an example embodiment of entity locating system 730. FIG. 12 further illustrates the service view perspective 700 and the display view perspective 702 of FIG. 11. The diagram includes examples of data management 704, collection 706, dissemination 708, and presentation 710. Data management 704 may include (i) data models, (ii) data collection or ingest, (iii) data storage, (iv) data logging (archiving), (v) data export, and (vi) data integration. Data models may define the entities and their relationships relevant to the systems and methods described herein. Data models may further provide a common vocabulary for integrating data from multiple sources.

Figure 13:
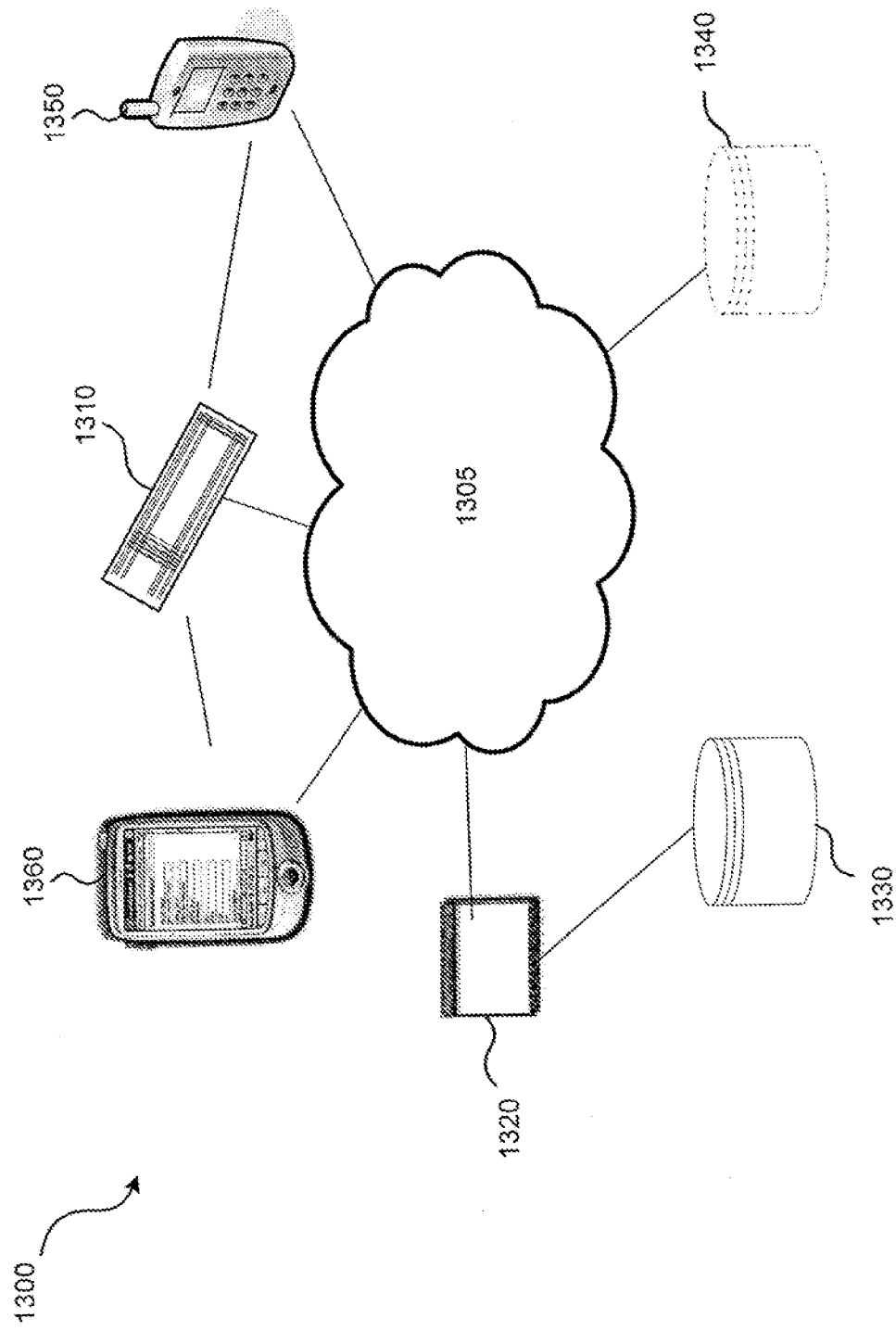
FIG. 13 is a diagram illustrating an exemplary environment in which the invention may be implemented according to one embodiment of the present invention.

FIG. 13 illustrates yet another exemplary environment 1300 in which the invention can be implemented. Environment 1300 is a wireless network environment such as LAN, WAN, or other similar wireless network. Alternatively, environment 1300 may comprises a combination of a wireless network and a wired network. For example, a mobile device may be wirelessly connected to a network 1305, and a ViewPoint 1320 may be directly connected to network 1305 via POTS or other suitable wired network. Environment 1300 can be in a urban setting, or other areas where GPS signals are not reliable. Alternatively, environment 1300 can be integrated with various data services such as GPS or web-based data services such as MSN Maps for example.

As shown, environment 1300 includes network 1305, RFID tag 1310, a computer system 1320, a database 1330, a server/database 1340, a mobile telephone 1350, and a mobile device (PDA) 1360. In addition to other functionalities that will be described herein, environment 1300 incorporates all of the features of RFID system 100 as described above. Similarly, RFID tag 1310 incorporates all features previously described for RFID tag 130.

In environment 1300, RFID tag 1310 may be located in front of a building entrance such that a mobile device can be detected as it enters the building. Alternatively, RFID tag 1310 comprises a plurality of tags that are distributed throughout a building. Each of the tags contains data specific to its location in the building. For example, RFID tags 1310 can be placed at various departments of a store such as the shoes department, men's clothing, women clothing, and home furnishing, etc. RFID tags 1310 at the shoes department may contain location information for informing mobile device 1360 of its location in the store.

In one embodiment, mobile device 1350 or 1360 transmits its location information along with its identification data to computer system 1320, also referred to as the ViewPoint system 1320. This allows the ViewPoint system 1320 to know the approximate location of the customer (the user of mobile device 1360) within the store. In this way, the ViewPoint system 1320 can notify the staff of the customer's presence in order to expedite service and to attend to the customer's needs. Additionally, the ViewPoint system 1320 may transmit information such as advertising materials related to shoes directly to the mobile device 1320 or to RFID tags 1310 located in the shoes department. In this embodiment, the ViewPoint system 1320 may communicate to RFID tags 1310 which, in turn, communicate to mobile devices 1350 or 1360. In this way, the information stored in RFID tags 1310 can be dynamically customized for different customers.

Similar to RFID tags 130, RFID tags 1310 may be disposed inside of a structure's building materials such as sheetrock, baseboard, ceiling and floor panels, window frames, and concrete, for example, during the construction of the structure. RFID tags 1310 can be purchased in bulk by the OEM of building materials, which places RFID tags 1310 into the building materials during the manufacturing process. These pre-disposed RFID tags 1310 may then be programmed or re-programmed at a later stage to hold data specific to their final destination.

As shown in FIG. 13, the ViewPoint system 1320 is connected to database 1330. The ViewPoint system 1320 is designed to interface with mobile device 1350 and PDA 1360 to collect device related data such as the device's present location, identification data and communications capabilities (802.11, Bluetooth, etc.). A mobile device can be identified by its device ID using 802.15 communications, or by the device's MAC address for 802.11 communications. The ViewPoint system 1320 stores data collected from mobile devices 1350-1360 into database 1330 with reference to the device identification data such as the device serial number or MAC address. In this way, data relating to a particular device may be easily retrieved in the future. The ViewPoint system 1320 may also store data in a remote database similar to database 1340.

Database 1340 is a remote database that stores essentially the same data as database 1330. However, since database 1340 is off-site and is directly connected to network 1305, it can be configured to collect and store data from other RFID environments, GPS systems or other relevant sources, such as RFID system 100. In this way, data relating to a particular mobile device can be shared between different RFID environments worldwide.

In environment 1300, the ViewPoint system 1320 is designed to collect data from a plurality of mobile devices that are within the communication range of RFID tag 1310. As an example of this functionality, once PDA 1360 is within the communication range of RFID tag 1310, RFID tag 1310 will transmit its location data to PDA 1360. This allows PDA 1360 to establish its location. As mentioned, location data may include the floor number and location within the floor, latitude, longitude, and elevation, or other location information, such as a serial number of RFID tag 1310 that may be mapped to a location. In one embodiment, the location data includes longitude data, latitude data, elevation data, and position data relative to a reference point such as an entrance of a structure, a section of a structure, or relative to compass headings (e.g., north, south, east, or west). The location of RFID tag 1310 may be stored in a database along with its serial number, for example. In this way, PDA 1360 may determine its location and send the location information received from RFID tag 1310 to the ViewPoint system 1320. Once the ViewPoint system 1320 receives the location data from PDA 1360, the ViewPoint system 1320 may look up the corresponding location data in database 1330.

In another embodiment of the invention, RFID tag 1310 is configured to support various search providers such as Mobile Local Search, Location-Based Search, Proximity Search, Spot Relevance, and other suitable location based search services. For example, the user of mobile device 1360 may want to search for directions to a point of interest. First, mobile device 1360 establishes communication with RFID tag 1310 and receives location data from RFID tag 1310. Next, mobile device 1360 sends the location data received from RFID tag 1310 to the ViewPoint system 1320. Similarly, the location data can be forwarded to one of the search providers or a service portal. Using the location data from the RFID tag 1310 as a reference point, the search provider or the ViewPoint system 1320 may find a the desired point of interest by matching the location information of RFID tag 1310 to points of interest stored in database 1330 or in the search providers' database. Location data from RFID tag 1310 may contain a street address of the building where RFID tag 1310 is located, or the precise location within a structure, such as a mall. This allows the ViewPoint system 1320 to more accurately locate a point of interest near the address provided by RFID tag 1310. Additionally, the ViewPoint system 1320 can calculate the direction from the location of RFID tag 1310 to the point of interest and send the direction data to mobile device 1360.

In a further embodiment, the ViewPoint system 1320 can be expanded to provide other information beyond location-based data to mobile devices 1350 and 1360 such as advertisement, inventory information, and product information, etc. Expanding on the example above, the user of a mobile device 1360 requests for the location of the nearest specific retail store, the ViewPoint system 1320 may compile advertisement data such as coupons and other sales promotions to send to mobile device 1360.

To provide better customer service, the ViewPoint system 1320 may keep records of mobile device behavior such as purchase history and past searches. Records may be kept along with mobile device MAC address, serial number, or other identification data. In this way, The ViewPoint system 1320 may determine what type of goods the owner of mobile device 1360 usually purchases. For example, the ViewPoint system 1320 may send coupons or advertisements regarding a computer game if its determined that the user of mobile device 1360 often purchases computer games and gaming related products. It should be noted that the coupons or advertisements sent by the ViewPoint system 1320 may be audio, video, image, text, or any combination thereof.

The ViewPoint system 1320 may also send inventory related data to mobile device 1360 based on the purchase history of mobile device 1360. In this way, the ViewPoint system 1320 may provide good customer service to the user of mobile device 1360. For example, every time the user of mobile device 1360 makes a purchase, the ViewPoint system 1320 saves the purchase information into database 1330. Information recorded may include the type of item purchased, price, and quantity, for example. If an clothing article is purchased, the ViewPoint system 1320 may also record the clothing article's style and size. Every time the user of mobile device 1360 purchases a product, a sale staff may ask for the user's address or other identification data. Alternatively, the user of mobile device 1360 may be identified whenever the user uses a credit card, check, or debit card. These data are recorded along with the user mobile device identification information. In this way, whenever the user of mobile device 1360 makes a purchase, the ViewPoint system 1320 records the purchase along with the identification information of mobile device 1360. In one embodiment, purchases made through a point-of-sale equipment such as check out computers and credit/debit card machines may be uploaded to a transactional/behavioral database or databases 1330 and 1340 by the point-of-sale equipment. The information uploaded may include item purchased, price, and the customer identification data such as the identification number of mobile device 1360. ViewPoint system 1320 may query these transactional data to customize data sent to mobile device 1360.

For example, using the behavioral data associated with mobile device 1360, the ViewPoint system 1320 may determine what type of shoes and shoe size the user of mobile device 160 typically purchases, for example. Once this determination is made, the ViewPoint system 1320 may send customized data to mobile device 1360. In this context, customized data comprises data prepared by the ViewPoint system 1320 based on the analysis of the behavioral data of mobile device 1360. For example, assume that mobile device 1360 is at a department store and RFID tag 1310 sends location data to mobile device 1360. The location data contains information to indicate that mobile device 1360 is currently at the shoe department Mobile device 1360 automatically sends its identification information and the location information to the ViewPoint system 1320. Upon receipt of these data, the ViewPoint system 1320 sends a notification to a staff at the shoe department to alert the staff that the user of mobile device 1360 is in the shoe area. Additionally, the ViewPoint system 1320 looks up the behavioral data of mobile device 1360. Since the ViewPoint system 1320 is aware that mobile device is currently at the shoe department, it can customize a data package with information relating to shoes to send to mobile device 1360. For example, the ViewPoint system 1320 may send mobile device 1360 a list of all shoes currently available at the store with sizes 13, for example. In this example, the sizes of the shoes included in the data package sent to mobile device 1360 is based on the purchase history of mobile device 1360.

Figure 14:
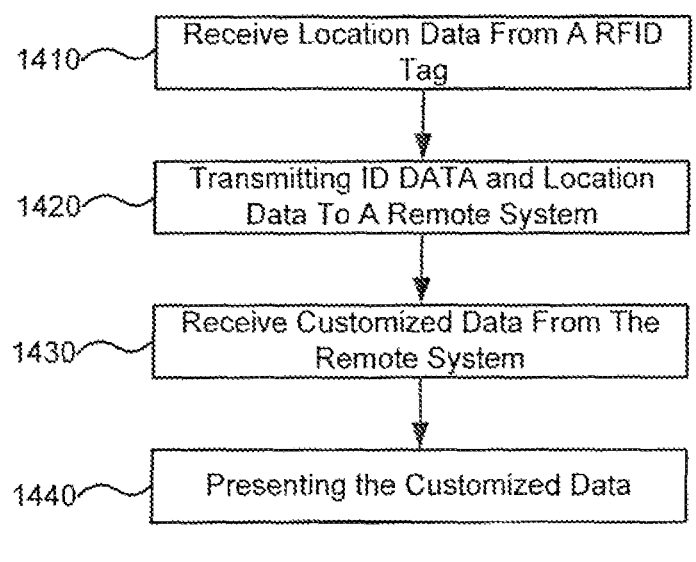
FIGS. 14-15 illustrate exemplary process flows for transferring location-based data between a mobile device and a computer system according to embodiments of the present invention.

FIG. 14 illustrates a method 1400 implemented by mobile devices 1350 and 1360 according to one embodiment of the present invention. Method 1400 starts at step 1410 in which mobile device 1350 or 1360 receives location data from RFID tag 1310. This process is typically automatic and occurs whenever mobile device 1350 enters the communication range of RFID tag 1310. In one embodiment, the user of mobile device 1350 may disable or enable communication with nearby RFID tags. As mentioned above, RFID tag 1310 may be a passive or an active tag. The mobile device 1350 will initiate the communication by sending out interrogation signals to RFID tag 1310. Again, this only occurs if the user enables the mode that allows communication with nearby RFID tags.

In step 1420, mobile device 1350 sends its identification information and the location data received from RFID tag 1310 to the ViewPoint system 1320. This data package may be sent wirelessly using standard wireless communication protocols such as Bluetooth, HomeRF, or WiFi (wireless fidelity) or an active RFID tag with connection to a network. Upon receipt of the data package, the ViewPoint system 1320 uses the identification data to query database 1330 for information on mobile device 1350. As mentioned above, information specific to mobile device 1350 such as purchase records can be used to tailor a promotional message or sales coupons to mobile device 1350. Contemporaneous to querying database 1330, the ViewPoint system 1320 may send a welcome message to mobile device based on received location data. For example, RFID tag 1310 may be placed at the entrance of the store. Accordingly, once the ViewPoint system 1320 receives the location data from mobile device 1350, it knows that mobile device 1350 has just entered the store and accordingly sends a welcome message. Further, the View- Point system 1320 may send a notification via email, phone, or page, to a staff to notify that the user of mobile device 1350 is present.

After the ViewPoint system 1320 finishes querying database 1330 for information on mobile device 1350, it compiles a data package to send to mobile device 1350. The data package may include general advertisement materials, product info, or other information that the ViewPoint system 1320 determines may be of interest the user of mobile device 1320. The data package may be audio, video, image, text or any of those combinations. As previously mentioned, the data package is based on the identification of the mobile device and the location data received from RFID tag 1310. In this way, the ViewPoint system 1320 may customize the data sent to mobile device 1350. In step 1430, mobile device receives the above customized data. Alternatively, the data package is a general data package that is sent to every mobile device within its effective range.

In step 1440, mobile device 1350 or 1360 presents the received data package from the ViewPoint system 1320 to the user of the device. This may be accomplished using a graphical user interface (GUI) on mobile device 1350. Alternatively, mobile device 1350 may present the data package via a speaker if the data package contains audio information. In addition, the data package may be presented using a combination of image, audio, and video information.

Figure 15:
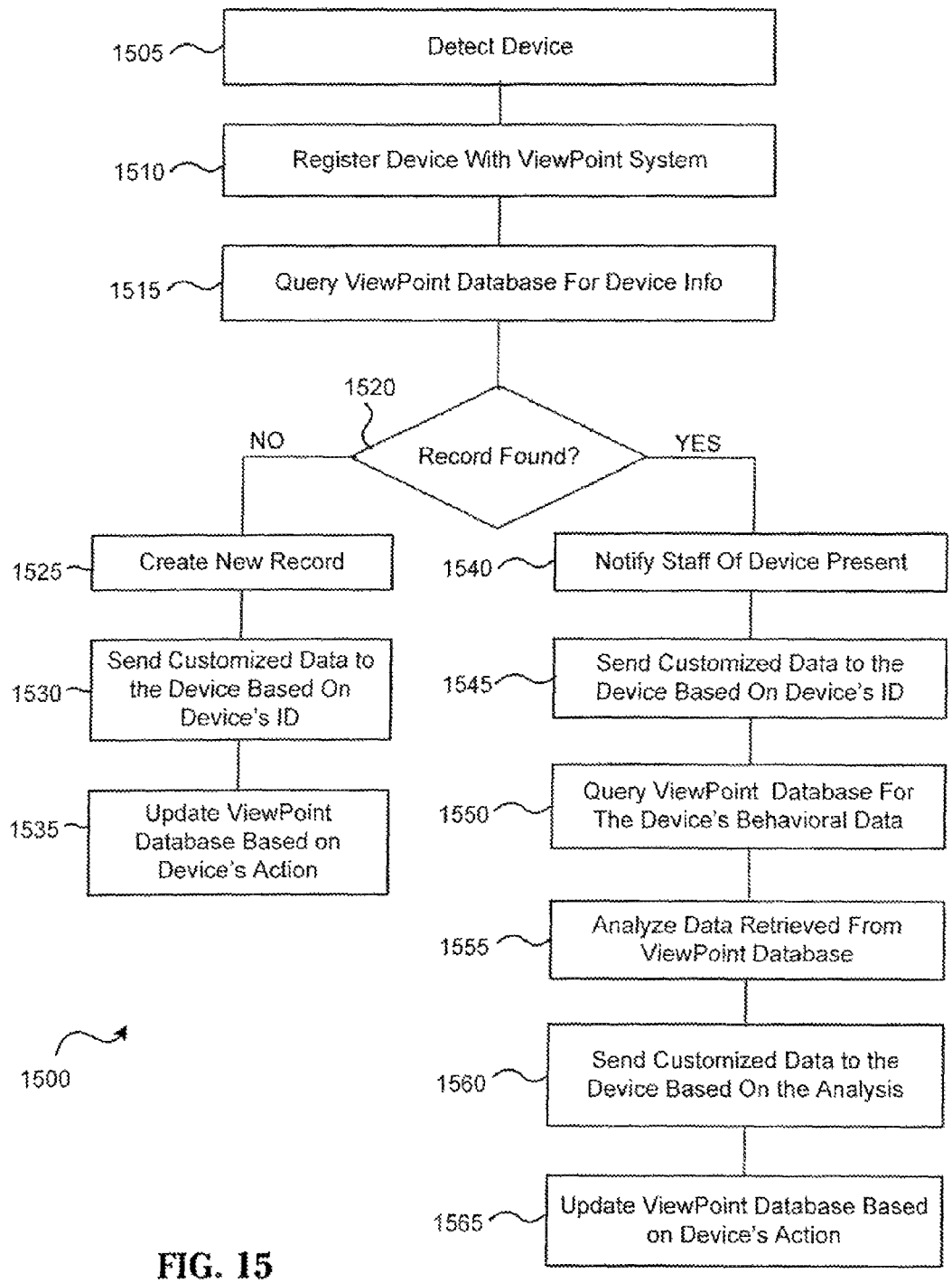

FIG. 15 illustrates a method 1500 according to one embodiment of the present invention. Method 1500 begins at step 1505 where mobile device 1350 or RFID tag 1310 is detected. Once communication is established between mobile device 1350 and RFID tag 1310, RFID tag 1310 sends location data to mobile device 1350.

In step 1510, mobile device 1350 registers itself with the ViewPoint system 1320. Mobile device 1350 registers itself by sending its identification information and/or the location information from RFID tag 1310 to the ViewPoint system 1320.

In step 1515, the ViewPoint system 1320 queries database 1330 or database 1340 for information relating to mobile device 1350. In step 1520, the ViewPoint system determines if there is a pre-existing record for mobile device 1350. If a record exists, the method 1500 proceeds to step 1540. If there is no record, the method 1500 proceeds to step 1525.

In step 1525, the ViewPoint system 1320 creates a new record for mobile device 1350. In step 1530, the ViewPoint system 1320 sends a customized data package to the new user. The customized data package may include store hours, upcoming events, promotional materials, and/or a welcome message to welcome the new customer.

In step 1535, the ViewPoint system 1320 updates database 1330 or database 1340 on the behavior of mobile device 1350. For example, the ViewPoint system 1320 may monitor and record all purchases made by mobile device 1350. The ViewPoint system 1320 may also monitor the mobile device's travel pattern, search history, etc., and record the activities into database 1330 and/or database 1340. This allows the ViewPoint system 1320 to learn the behavior of mobile device 1350, which will enable the ViewPoint system to better serve the user of mobile device 1350 when he/she returns to the store in the future.

If in step 1520, a record is found for mobile device 1350, then the method 1500 process to step 1540. In step 1540, the ViewPoint system 1320 notifies a staff of the store that mobile device 1350 is in the area. Since the identification of mobile device 1350 is known at this stage, the ViewPoint system 1320 may notify the appropriate staff in order to better serve the user of mobile device 1350. Additionally, in step 1545, the ViewPoint system 1320 may send a message customized specifically for the user of mobile device 1350. For example, if the record shows that the user of mobile device 1350 is Mr. Smith, the ViewPoint system 1320 may send a welcome message that states "Welcome Mr. Smith." Additionally, the customized data package may include store hours, upcoming events, and promotional materials.

In step 1550, the ViewPoint system 1320 performs a detailed query for behavioral data of mobile device 1350. In step 1555, the behavioral data is analyzed for patterns. In step 1560, the ViewPoint system 1320 sends a second customized data package to mobile device 1350 based on the analysis of the behavioral data. The second customized data package may include promotional materials specifically tailored for mobile device 1350. For example, if the purchase history of mobile device 1350 shows that tennis equipment is frequently purchased by the user of mobile device 1350, then the ViewPoint system 1320 may send coupons or promotional materials relating to tennis to mobile device 1350. It should be noted that step 1545 may be combined with step 1560. In this way, mobile device 1350 only receives 1 comprehensive data package instead of several data packages.

In step 1565, the ViewPoint system 1320 updates database 1330 and/or database 1340 on the behavior of mobile device 1350. Similar to step 1535, the ViewPoint system 1320 monitors and records all purchases made by mobile device 1350. The ViewPoint system 1320 may also monitor the mobile device's travel pattern, search history, etc., and record these activities into database 1330 and/or database 1340. Even though the method is described in the order shown, the steps of method 1500 may be performed in various orders without departing from the scope of the invention.

Figure 16:
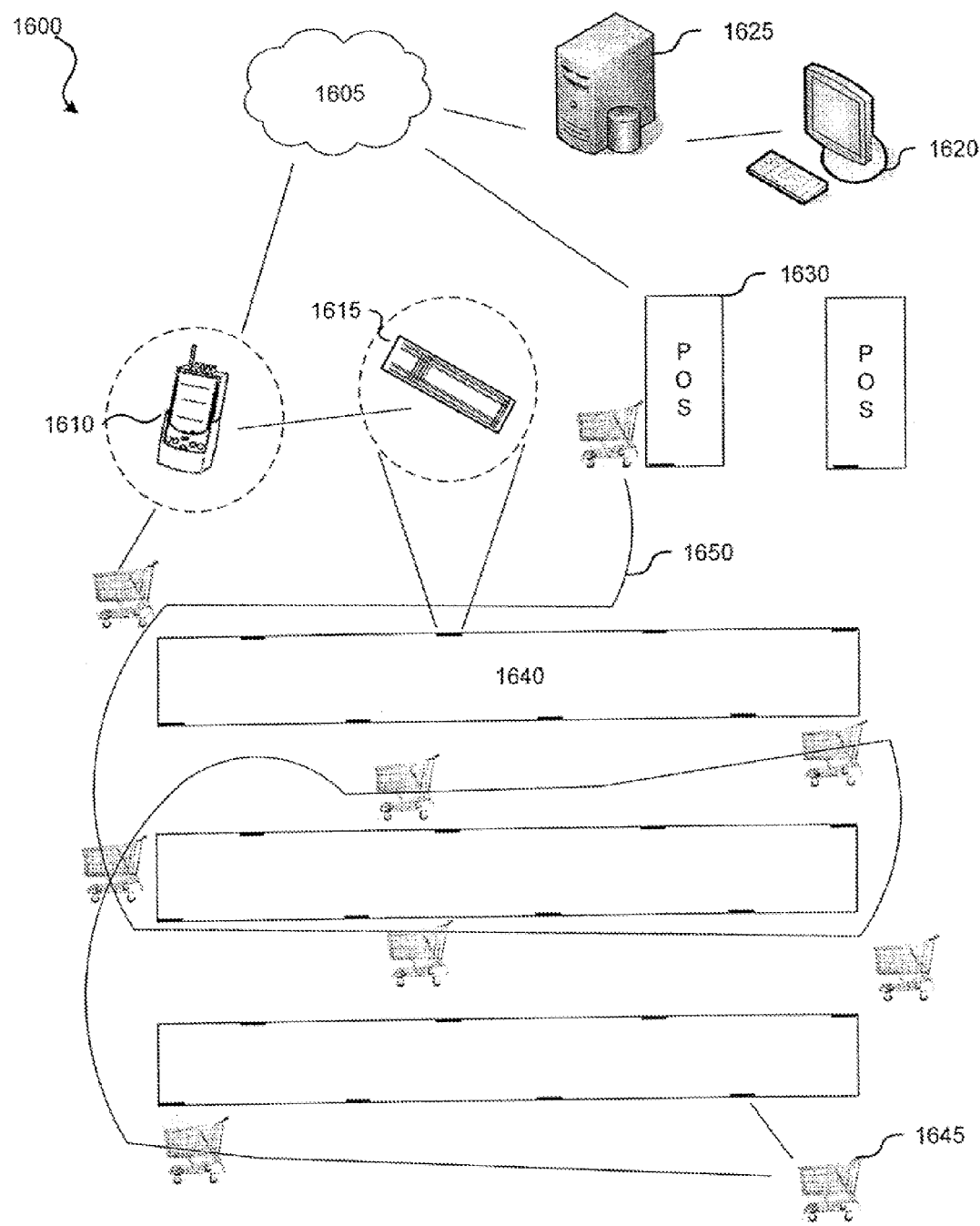
FIG. 16 is a diagram illustrating an exemplary environment in which a shopping behavior tracking system may be implemented according to one embodiment of the present invention.

FIG. 16 illustrates yet another exemplary environment 1600 in which methods and systems for tracking shopping behavior may be implemented. Environment 1600 is a wireless network environment such as LAN, WAN, or other suitable wireless network. Similar to environment 1300, environment 1600 may comprises a combination of a wireless network and a wired network. For example, a mobile device such as, for example, a interrogator relay unit 1610 may be wirelessly connected to a network 1605. A server or traffic tracking system 1620 may be wirelessly or directly connected to network 1605 via POTS or other suitable wired network. In one embodiment, interrogator relay unit 1610 is a RF transmitter/receiver device configured both transmit and receive RF signals.

As shown, environment 1600 includes network 1605, IRU 1610, an RFID tag 1615, traffic tracking system 1620, a database 1625, a point-of-sale terminal 1630, a cart 1645, and a shelf 1640. In addition to other functionalities that will be described herein, environment 1600 incorporates all of the features of RFID system 100 as described above. Similarly, RFID tag 1615 incorporates all features previously described for RFID tag 130.

In environment 1600, a plurality of RFID tags 1615 may be distributed on shelf 1640. RFID tags 1615 may be evenly or randomly distributed on shelf 1640. For example, an RFID tag can be placed on shelf 1640 at every other 5 feet. The distance between each RFID tag can be adjusted based on the resolution of detection desired. In one embodiment, RFID tag 1615 is configured to respond to interrogation signals sent out by IRU 1610. Once RFID tag 1615 detects the interrogation signal, it sends location information to IRU 1610. The location information can be information about its location with respect to shelf 1640 or to a reference point in the store. The location information can include an aisle number, a section number, and other suitable location information. An example of location information is "Aisle 5, Section 4, Produce."

As mentioned, RFID tag 1615 may be evenly or randomly distributed within a shelf or a structure of the store (e.g., wall, floor, and fixture). The distance between each RFID tag 1615 may depend on the sensitivity of the IRU and RFID tag 1615. The distance between each tag should be selected such that IRU 1610 is not confused as to its location because it has received too many responses from a plurality of RFID tags 1615. For example, if the transmission range of the RFID tag 1615 is 1-2 feet, then the distance between each RFID tag 1615 may be as little as 2 feet or at a distance such that IRU 1610 only receives a maximum of 2 or 3 location information from different RFID tags 1615. Generally, a high number of RFID tags will translate to a high tracking resolution. It should be noted that other methods can be implemented to adjust the resolution and sensitivity of IRU 1610 and RFID tag 1615. For example, the output power of the interrogation signal can be adjusted to reduce or increase the range of the interrogation signal.

As shown in FIG. 16, RFID tags 1615 are distributed on both sides of shelf 1640. Shelf 1640 can be located in a store such as, for example, a grocery store, a department store, or an electronic store. In one embodiment, IRU 1610 can be placed on a shopping cart 1645 or basket. In this way, a travel pattern 1650 of IRU 1610 through the store may be tracked by traffic tracking system 1620 as the cart or basket is being used by a customer.

In operation, IRU 1610 transmits an interrogation signal which may be received by a nearby RFID tag 1615. Once the interrogation signal is received, RFID tag 1615 sends its location information to IRU 1610. In one embodiment, IRU 1610 transmits the received location information and identification information of the IRU to traffic tracking system 1620 and/or database 1625. Preferably, IRU 1610 immediately transmits the received location information and the identification information immediately after it has received the location information from nearby RFID tag. In one embodiment, IRU 1610 also transmits timestamp data long with the location information. In this way, traffic tracking system 1620 may determine how long an IRU is located at a certain RFID tag. For example, traffic tracking 1620 may receive location data that comprises "Section 1, Bakery" at several consecutive timestamp intervals (e.g., 16:01, 16:02, 16:04, 16:05).

In one embodiment, IRU 1610 is configured to transmit interrogation signals at random intervals. Alternatively, IRU 1610 is configured to transmit interrogation signals at a predefined time intervals. In this embodiment, IRU 1610 can also be configured to send data to traffic tracking 1620 at a predefined time interval regardless of whether it has received location data from a nearby RFID tag. In one embodiment, IRU 1610 is configured to timestamp each location data received from an RFID tag. Alternatively, IRU 1610 may or may not timestamp the location data if it is configured to transmit its status at predefined intervals. If no location data has been received, IRU 1610 may transmit a 'no-data' to traffic tracking 1620. In this way, each location data point stored in database 1625 can represent a time interval. Thus, time duration can be computed based strictly on the number of location data points.

Preferably, all data transmitted by IRU 1610 are stored in database 1625. In this way, traffic tracking system 1620 may query database 1625 to generate a behavior report on a particular IRU using the IRU identification. In one embodiment, traffic tracking system 1620 is configured to generate a behavior report that includes a travel pattern (e.g., travel pattern 1650) and a time duration report showing how long IRU 1610 is at a particular RFID tag 1615 or location of the store.

In one embodiment, IRU 1610 is configured to send its identification information to point-of-sale terminal 130 once it has determined that it is at the point-of-sale terminal. This can be accomplished by analyzing the location data received from RFID tag 1615. AN RFID tag at point of terminal 1630 can have a unique identifier that allows IRU 1610 to recognize that it is at the point-of-sale terminal. In one embodiment, IRU 1610 is also configured to notify traffic tracking system 1620 that it is located point-of-sale terminal 1630. In this way, traffic tracking system 1620 may wirelessly configure IRU 1610 to stop collecting location information from RFID tag 1615. The location data collected at point-of-sale terminal 1630 can also be used as the last data point used to determine travel pattern/route 1650.

In one embodiment, point-of-sale terminal 1630 transmits a point-of-sale data package to traffic tracking system 1620 after a sale transaction is completed. A point-of-sale data package may include purchaser information, items purchased information, coupon or discount program used, and the IRU's identification. Purchaser information may include a credit card, checking account, club membership information, or other suitable information that can identify a particular customer. Items purchased information may include names of items purchased, quantity purchased, price, and date and time of purchase. In this way, traffic tracking system 1620 can generate a shopping behavior report that may include statistics such as, for example, ten most frequently purchased items, average spending per transaction, traffic pattern the customer or the traffic pattern of the IRU being associated to the transaction, average time at various locations in the store, average time in the store, hours and day of week the customer usually visit the store, etc.

In one embodiment, environment 1600 includes an RFID tag on a consumer card (not shown) such as, for example, a club card (e.g. a grocery store saver's card) or a store credit card. In this embodiment, IRU 1610 can be configured to interrogate a nearby consumer card and to receive a customer information from the consumer card. The customer information can then be transmitted to traffic tracking system 1620, which can associate the customer information with other information such as, for example, the current IRU identification information and information in the point-of-sale data package after the transaction is completed. In this way, traffic tracking system 1620 has multiple means for identifying an individual customer.

Figure 17:
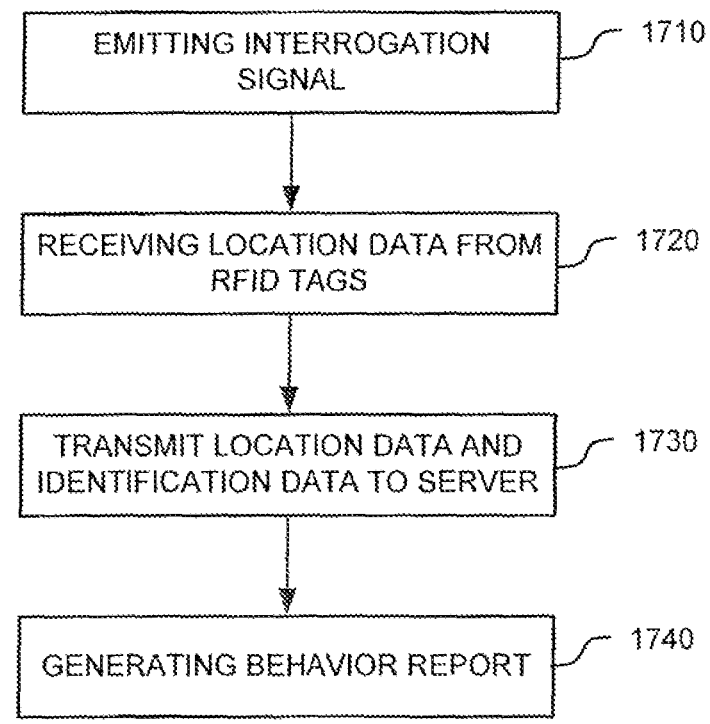
FIGS. 17-18 illustrate exemplary process flows for tracking shopping behavior according to embodiments of the present invention.

FIG. 17 illustrates a high-level process flow 1700 implemented by a system and method for tracking shopping behavior according to one embodiment of the present invention. As illustrated in FIG. 17, process flow 1700 starts at step 1710.

In step 1710, an interrogation signal is emitted. In one embodiment, a plurality of interrogation signals is emitted by IRU 1610 at a random or predetermined intervals. In response to the interrogation signal, any RFID tag within the transmission range of the interrogation signal is configured to respond by emitting a response signal. The response signal may include information regarding the location of the RFID tag with respect to a reference point.

In step 1720, the location data is received by IRU 1610. In step 1730, the location information is transmitted to a remote server along with identification information of the IRU. The identification information and the location data are then stored in a database such as, for example, database 1625 while also maintaining their association.

In step 1740, a behavior report is generated using the information stored in database 1625. In one embodiment, the behavior report includes travel pattern of the IRU with respect to a plurality of RFID tags positioned throughout a structure such as a store.

Figure 18:
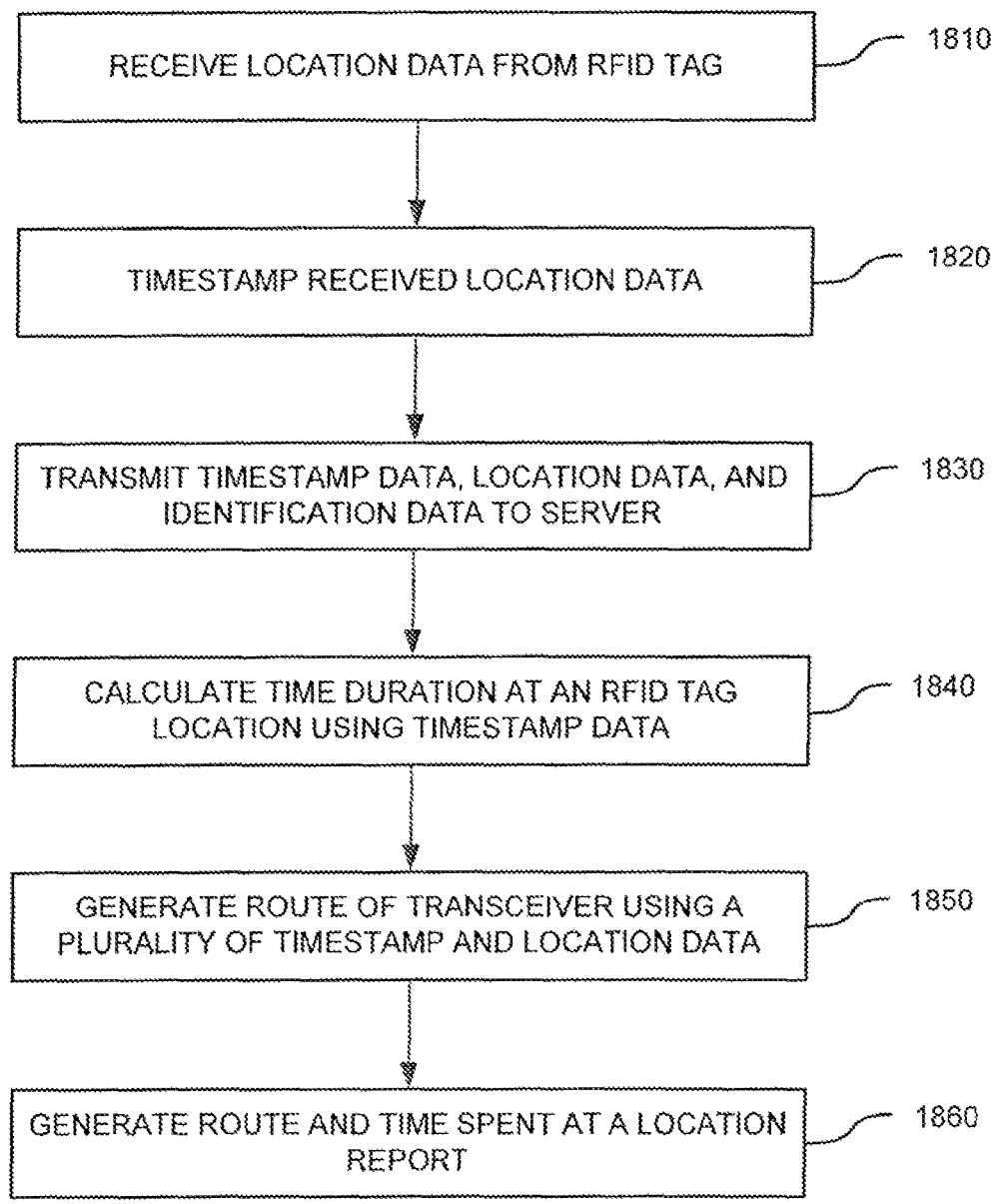

FIG. 18 is a diagram that illustrates a process flow 1800 that can be implemented by a system and method for tracking shopping behavior according to one embodiment of the present invention. In step 1810, location data from RFID tag 1615 is received by IRU 1610 in response to IRU 1610 interrogation signal.

In step 1820, timestamp data is created for the received location data. In one embodiment, each location data is preferably timestamped. Timestamp data may be created and appended to the location data. Alternatively, timestamp data can be separately created and associated to the location data received. In one embodiment, IRU 1610 is configured to timestamp the received location data. Preferably, the received location data is timestamped immediately after it is received.

In step 1830, IRU 1610 is configured to transmit the timestamp data, the location data, and the identification data of the IRU to traffic tracking system 1620, which then stores the data in database 1625.

In step 1840, the time duration of an IRU being within the transmission range of a particular RFID tag is calculated. To illustrate, let us assume an RFID tag with location data of "Aisle 6, Section 2, Bread," which will be referred to as the bread RFID tag. Let us further assume that the IRU identification information is "IRU No. 2." To calculate the time IRU 1610 is within the transmission range of the bread RFID tag, traffic tracking system 1620 may query database 1625 for data associated with IRU No. 2. The query results may be as follows:

| IRU ID | RFID Location Data | Time |
|---|---|---|
| No. 2 | Aisle 6, Section 2, Bread | 8/2/07 13:06:30 |
| No. 2 | Aisle 6, Section 2, Bread | 8/2/07 13:07:00 |
| No. 2 | Aisle 6, Section 2, Bread | 8/2/07 13:07:30 |
| No. 2 | Aisle 6, Section 2, Bread | 8/2/07 13:08:00 |
| No. 2 | Aisle 6, Section 3, Deli | 8/2/07 13:08:30 |

Using the above query results, traffic tracking system 1620 may then determine that IRU No. 2 was at the bread section for approximately 1.5 minutes. As shown, the time resolution depends on the intervals of the data points. The time resolution can be adjusted by adjusting the frequency of data sampling and collection in steps 1810-1830. In one embodiment, traffic tracking system 1620 is configured to determine the time duration of an IRU at each RFID tag.

In step 1850, the route or path of an IRU is determined. In one embodiment, a graphical layout of preferably all RFID tags is produced and the route of a an IRU is overlaid on top of the graphical layout. In this way, the route of an IRU can be visually perceived. An example of a visual representation of an IRU route and the layout of RFID tags is shown in FIG. 1. In one embodiment, the route of an IRU is determined by querying database 1625 for data associated with the IRU of interest. Each data point in the query results can then be displayed and connected together to form a representation of the travel path. In one embodiment, the end of the route can be determined by detecting when the IRU is at a point-of-sale terminal or other designated area for a predetermined amount of time. For example, traffic tracking system 1620 may determine that a cart has been abandoned if it has been in the same location for more than 30 minutes. As another example, traffic tracking system 1620 may determine that the path of a cart has ended when the cart reached a point-of-sale terminal and has been there for more than 3 minutes. The beginning of a path may be determined once a cart enters a zone such as, for example, the front door, or the produce area.

Figure 19:
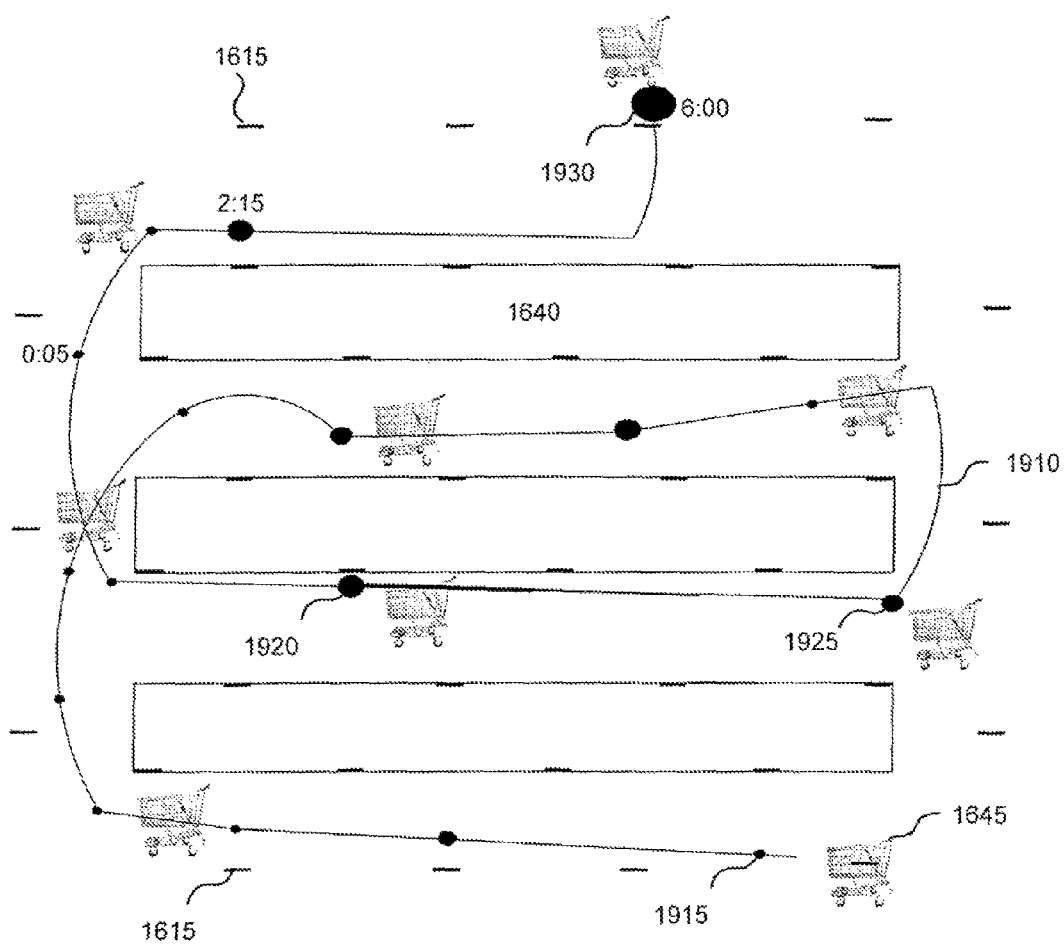
FIG. 19 is a diagram illustrating an exemplary environment in which a shopping behavior tracking system may be implemented according to one embodiment of the present invention.

In step 1860, a route and time spent at preferably each data point (RFID location) report is generated. In one embodiment, a graphical report is generated. FIG. 19 illustrates an example graphical report generated by traffic tracking system 1620 according to one embodiment of the present invention. As shown in FIG. 19, a plurality of RFID tags 1615 is distributed throughout a store. In step 1860, path 1910 is generated by querying database 1625 for data associated to cart 1645. In step 1860, a plurality of dots is used to represent data points of the query. Each dot is approximately placed based on the location data of the RFID tag. In one embodiment, time duration can be displayed next to the dot. Alternatively, the size of the dot can varies with respect to the time duration spent at the dot. In this way, one can perceive the travel path of the IRU and the time spent at each location by observing the size of each dot relative to each other. For example, a dot 1915 is relatively small than a dot 1920. This indicates that cart 1645 spent more time at dot 1920 than at dot 1915. FIG. 19 also indicates that cart 1645 spent the most time at dot 1930, which is at a point-of-sale terminal. In one embodiment, the size of the line that traces the path of cart 1645 can varies to represent the time spent near the closest data point. For example, line size immediate to the right of dot 1920 can be large and become progressively smaller as it approaches 1925.

Figure 20:
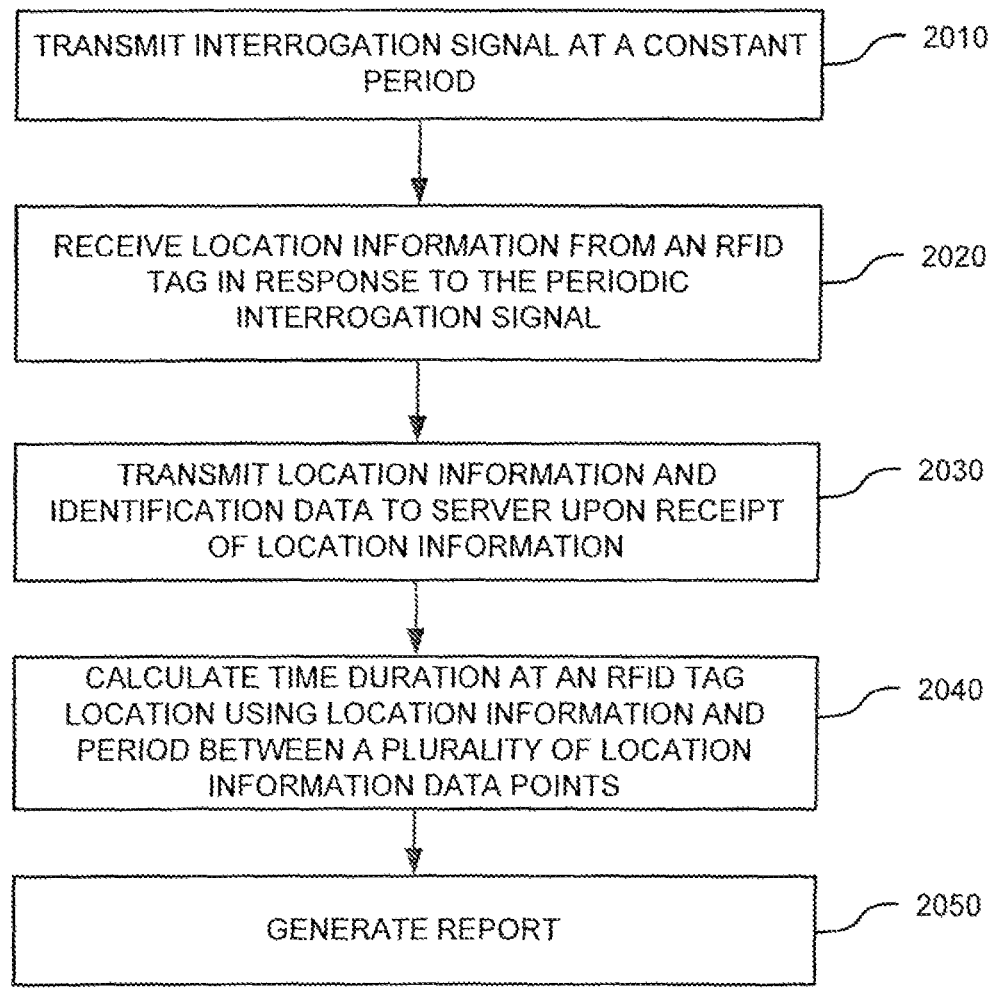
FIGS. 20-22 illustrate exemplary process flows for tracking shopping behavior according to embodiments of the present invention.

FIG. 20 is a diagram that illustrates a process flow 2000 that can be implemented by a system and method for tracking shopping behavior according to one embodiment of the present invention. It should be noted that process flow 2000 can be used in conjunction with process flow 1800 to collect additional data. Referring now to FIG. 20, in step 2010, interrogation signals are transmitted at a constant interval. The period or interval may be 5 or 10 seconds for example. In one embodiment, traffic tracking system 1620 can adjust the frequency in which IRU 1610 is emitting interrogation signal. In step 2020, location data from a nearby RFID tag is received.

In step 2030, IRU 1610 transmits the location information from the nearby RFID tag along with the IRU identification information. In one embodiment, step 2030 is preferably performed immediately after step 2020.

In step 2040, the time duration of an IRU at one or more RFID tags is calculated. This may be done by keeping track of the number of consecutive data points a having the same location data. For example, if the period is 5 seconds and there are 7 consecutive data points that have the same location data from a single RFID tag, it follows that the IRU is near that particular RFID tag location for at least 35 seconds. In one embodiment, traffic tracking 1620 is configured to calculate at least the following statistics: the time duration an IRU is near (located within transmission range of the tag) each RFID tag; the total time duration for each RFID tag; and average time each IRU is near each RFID tag. In step 2050, a report is generated. In one embodiment, the report generated in step 2050 is similar to the report generated in step 1860.

Figure 21:
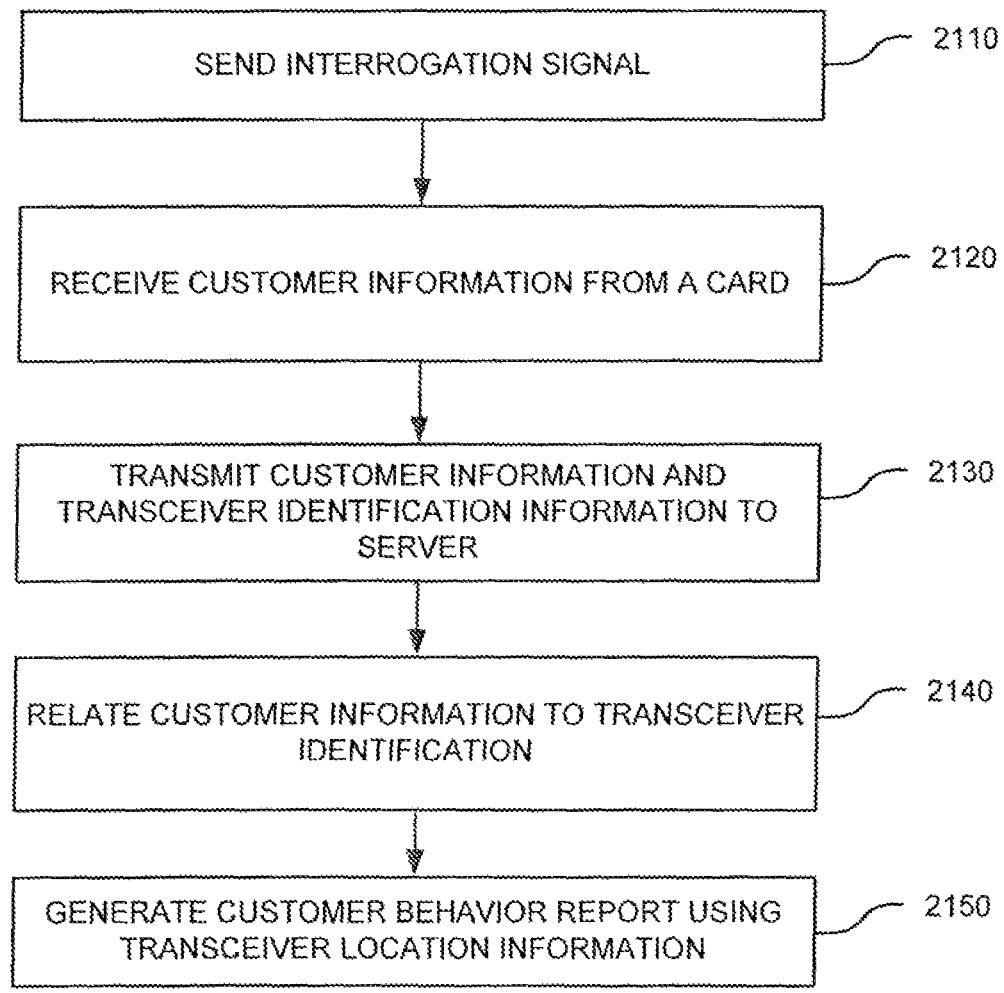

FIG. 21 is a diagram that illustrates a process flow 2100 that can be implemented by a system and method for tracking shopping behavior according to one embodiment of the present invention. It should be noted that process flow 2100 can be used in conjunction with process flows 1800 and 2000 to collect additional data. Referring now to FIG. 21, in step 2110, an interrogation signal is transmitted. In one embodiment, the transmitter or interrogator is configured to send out a customized interrogation signal to solicit information from an RFID tag located on a consumer card such as, for example, a club card, a saver card, a store credit card, etc. In one embodiment, step 2110 is only performed at the beginning of the tracking process and only after the IRU is located at a certain zone such as, for example, the front entrance or the produce section.

In step 2120, a customer information is received from the RFID tag on the consumer card. The customer information may include a membership number, a telephone number, name, and address, etc. In step 2030, the customer information and the IRU identification information are sent to traffic tracking System 1620. In one embodiment, step 2030 is preferably done immediately after step 2120.

In step 2140, the customer information is associated with the IRU identification information. This enables traffic tracking system 1620 to equate the behavior of the IRU to the behavior of the customer. In step 2150, a behavior report is generated. In one embodiment, the customer information includes gender and age information. Thus, the behavior report may include path of travel for a selected customer. The behavior report may include other statistics broken down by age group, gender, and other demographics, such as, for example, most visited location of a store for males and females, and most frequently used path of travel by 25-30 years old, etc.

In one embodiment, steps 2110-2120 can be repeated when the IRU is located at a point-of-sale terminal. In this way, the customer information data can be compared and verified prior to transmitting the customer data to traffic tracking system 1620. If, for example, the same customer information is detected during the first and second iterations of steps 2110-2120, then the customer information can be assumed to be the rightful owner of the cart. This helps reduce the chance of reading in stray data from a customer card that happens to be located within the transmission range of the transmitter.

Figure 22:
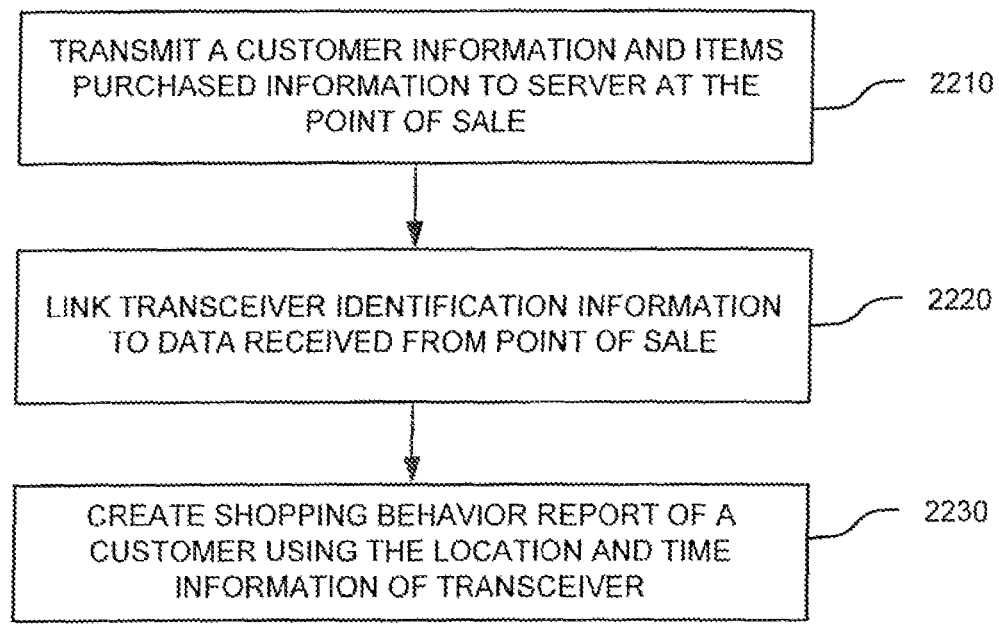

FIG. 22 is a diagram that illustrates a process flow 2200 that can be implemented by a system and method for tracking shopping behavior according to one embodiment of the present invention. It should be noted that process flow 2200 can be used in conjunction with process flows 1800, 2000, and 2100 to collect additional data. Referring now to FIG. 22, in step 2210, a customer information and a transaction related information is transmitted to traffic tracking system 1620 after a sale transaction has been completed at a point-of-sale terminal. The customer information transmitted by a point-of-sale terminal may include credit card number, address, name, sex, age, checking account number, etc. The customer information may be obtained from the customer's method of payment and use of a club or membership card. The transaction related information may include items purchased, quantity, price of each item, total price of purchase, coupon or discount used, etc.

In step 2220, the customer information and the transaction related information is associated with the IRU in the cart currently located at the point-of-sale terminal. In this way, traffic tracking 1620 may associate the customer information and the transaction related information to the IRU identification. This also enables traffic tracking 1620 to associate data collected during process flows 1800, 2000, 2100, and 2200 with one another. In step 2230, a shopping behavior report is generated. In one embodiment, step 2230 includes one or more report features of steps 1860, 2050, and 2150. In one embodiment, the behavior report generated by step 2230 may include statistics such as, for example, average money spent per transaction by age, type of product purchased by gender, and relationship between the average money spent per transaction and time spent in the store, etc.

According to the invention, a base unit may consist of hardware and software that monitors and communicates with smart IRUs 714 or other mobile devices 1350 and 1360 using wireless communication technologies. Base unit operation may be configurable, allowing it to be programmed to operate in a variety of RF and communication modes. Base unit software runs on computers (including but not limited to laptops) and other smart devices such as PDAs, Blackberries and other portable computer-based devices. Base unit hardware may interface to host computer devices using industry standard interfaces. Base unit dissemination service supports both push and pull requests for information from external systems, users and display devices. Base unit data management service supports the collection or ingest, storage, logging and integration of data from RFID entity location systems and from external systems. By way of example, external systems may include GIS systems, GPS and other tracking systems, and data systems used by RFID entity location system users. A complete log of data events and quality of service data is maintained for future reference.

The presentation service formats, integrates and adjusts data for display based on the user's needs and the characteristics of the display device. In addition, the presentation service allows information to be displayed in a manner adjusted for the physical size of the display. The base unit collection service ingests and manages both dynamic and static information.

The systems and methods described herein may be implemented using a computer. In one embodiment the computer may be a desktop, laptop, or notebook computer. In another embodiment the computer may be a mainframe, supercomputer, or workstation. In yet another embodiment the computer may be a hand-held computing device such as a PDA, smart phone, cell phone 718, palmtop, etc. The computer may also represent computing capabilities embedded within or otherwise available to a given device.

The computer may include one or more processors, which may be microprocessors, microcontrollers, or other control logic and memory, such as random access memory ("RAM"), read only memory ("ROM") or other storage device for storing information and instructions for the processor. Other information storage mechanisms may also be connected to the computer, such as a hard disk drive, a floppy disk drive, a magnetic tape drive, an optical disk drive, a CD or DVD drive (R or RW), or other removable or fixed media drive, such as a program cartridge and cartridge interface, a removable memory (for example, a flash memory or other removable memory module) and memory slot, a PCMCIA slot and card, and other fixed or removable storage units and interfaces that allow software and data to be transferred from the storage unit to the computer.

The computer may also include a communications interface that may be used to allow software and data to be transferred between the computer and external devices. Examples of the communications interface may include a modem or softmodem, a network interface (such as an Ethernet, network interface card, or other interface), a communications port (such as for example, a USB port, IR port, RS232 port or other port), or other wired or wireless communications interface. Software and data transferred via the communications interface are carried on signals, which may be electronic, electromagnetic, optical or other signals capable of being received by a given communications interface. The signals may be provided to the communications interface using a wired or wireless medium. Some examples of a channel may include a phone line, a cellular phone link, an RF link, an optical link, a network interface, a local or wide area network, the internet, and other communications channels.

In this document, the terms "computer program medium" and "computer usable medium" are used to generally refer to media such as, for example, the memory, storage unit, media, and signals on a channel. These and other various forms of computer usable media may be involved in carrying one or more sequences of one or more instructions to the processor for execution. Such instructions, generally referred to as "computer program code" (which may be grouped in the form of computer programs or other groupings), when executed, enable the computer to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" docs not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for tracking an interrogator relay unit (IRU) associated with a customer within a structure, comprising:
   emitting an RF interrogation signal using the IRU;
   receiving, at the IRU, location data from one or more RFID tags in response to the RF interrogation signal;
   transmitting the location data, an identification information of the IRU, and timestamp data to a remote server using the IRU; and
   generating a customer behavior report using the transmitted location data, the identification information, and the timestamp data, wherein the customer behavior report includes a travel pattern of the IRU, a time duration report showing how long the IRU was at each of a plurality of locations, average time spent at various locations within the structure, and average time in the structure;
wherein at least one RFID tag includes an address, contact information, and a building schematic for the structure.

2. The method of claim 1, wherein the RFID tags are mounted within the structure based upon a predetermined standard that addresses the mounting location of each RFID tag and a prescribed distance between RFID tags.

3. The method of claim 1, further comprising calculating the time duration of the IRU within a transmission range of an RFID tag by analyzing the timestamp data associated with the IRU identification information.

4. The method of claim 1, wherein the RFID tags are passive RFID tags.

5. The method of claim 1, wherein the behavior report is generated using location data from a plurality of RFID tags.

6. The method of claim 5, wherein the plurality of RFID tags are located in a store.

7. The method of claim 6, wherein the location data comprises location information concerning where an RFID tag is located within the store.

8. The method of claim 7, wherein the IRU is located on a mobile container used for storing shopping materials.

9. The method of claim 1, further comprising:
transmitting the identification information of the IRU to a point-of-sale device; and
transmitting a point-of-sale data package to the remote server once a sale transaction is completed using the point-of-sale device, wherein the point-of-sale data package contains information relating to the transaction.

10. The method of claim 9, wherein the point-of-sale data package comprises purchaser information and items purchased information.

11. The method of claim 10, wherein the point-of-sale data package further comprises date and time of transaction and total price of the transaction.

12. The method of claim 10, wherein the purchaser information is credit card information or club member information.

13. A system for tracking shopping behavior comprising:
a plurality of passive RFID tags distributed within a structure, each RFID tag configured to contain location information regarding its position within the structure;
an IRU associated with a customer and configured to receive the location information from the plurality of RFID tags in response to interrogation signals transmitted by the IRU, wherein the IRU is configured to transmit the location information and an identification information of the IRU to a remote database; and
a report generator configured to query the remote database and to generate a customer behavior report including a travel pattern of the IRU, a time duration report showing how long the IRU was at each of a plurality of locations, average time spent at various locations within the structure, and average time in the structure;
wherein at least one RFID tag includes an address, contact information, and a building schematic for the structure.

14. The system of claim 13, wherein the remote database is configured to store and timestamp each location information received.

15. The system of claim 13, wherein the RFID tags are mounted within the structure based upon a predetermined standard that addresses the mounting location of each RFID tag and a prescribed distance between RFID tags.

16. The system of claim 13, wherein the report generator is configured to generate the behavior report that includes the time duration of the IRU within a transmission range of one RFID tag using the timestamp data generated by the remote database.

17. The system of claim 13, further comprising:
a point-of-sale device configured to transmit purchaser information and items purchased information to the remote server once a sale transaction is completed to the remote database;
wherein the report generator is configured to generate a sale report using data received from the point-of-sale device.

18. The system of claim 17, wherein the purchaser information is credit card information or club member information.

* * * * *